(12) United States Patent
Lei

(10) Patent No.: US 11,882,572 B2
(45) Date of Patent: Jan. 23, 2024

(54) METHOD AND APPARATUS FOR AUTONOMOUS FLEET HANDLING USING BROADCAST GUIDANCE

(71) Applicant: FORD GLOBAL TECHNOLOGIES, LLC, Dearborn, MI (US)

(72) Inventor: Oliver Lei, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/875,306

(22) Filed: Jul. 27, 2022

(65) Prior Publication Data

US 2022/0369286 A1 Nov. 17, 2022

Related U.S. Application Data

(63) Continuation of application No. 17/115,981, filed on Dec. 9, 2020, now Pat. No. 11,412,479.

(51) Int. Cl.
| | |
|---|---|
| *H04W 72/30* | (2023.01) |
| *B60W 60/00* | (2020.01) |
| *H04W 4/029* | (2018.01) |
| *H04W 4/46* | (2018.01) |
| *H04W 72/27* | (2023.01) |

(52) U.S. Cl.
CPC ........ *H04W 72/30* (2023.01); *B60W 60/0027* (2020.02); *H04W 4/029* (2018.02); *H04W 4/46* (2018.02); *H04W 72/27* (2023.01)

(58) Field of Classification Search
CPC ........ B60W 60/0027; G08G 1/096775; G08G 1/094; G08G 1/0112; G08G 1/096725; G08G 1/0141; G08G 1/096741; H04W 72/30; H04W 4/029; H04W 72/27; H04W 4/46

See application file for complete search history.

(56) References Cited

U.S. PATENT DOCUMENTS

| | | | |
|---|---|---|---|
| 9,432,715 B2 | 8/2016 | Miyaki | |
| 9,513,134 B1 * | 12/2016 | Ishikawa | ............ G08G 1/0141 |
| 10,341,722 B2 | 7/2019 | Petruzzelli | |

(Continued)

*Primary Examiner* — Congvan Tran
(74) *Attorney, Agent, or Firm* — Joseph Zane; Brooks Kushman P.C.

(57) ABSTRACT

A server may determine that two-way communication to a plurality of autonomous vehicles has been lost, during conditions suitable for using the autonomous vehicles for evacuation. The server may also determine evacuation points and determine a geographic perimeter around each evacuation point, the perimeter projected to encompass sufficient vehicles to service the evacuation point based on determined evacuation needs of a given evacuation point. Further, the server may formulate an evacuation instruction for each evacuation point, each instruction having one or more parameters, including at least the geographic perimeter corresponding to a given evacuation point, wherein a given evacuation instruction instructs vehicles executing the instruction to travel to the corresponding evacuation point. The server additionally may instruct broadcast of one or more of the evacuation instructions from an ATSC transmitter known to cover a geographic region including at least a portion of the geographic perimeter of each evacuation instruction transmitted.

12 Claims, 10 Drawing Sheets

(56) References Cited

U.S. PATENT DOCUMENTS

| | | | |
|---|---|---|---|
| 10,433,022 B2 | 10/2019 | Norin et al. | |
| 2005/0086227 A1 | 4/2005 | Sullivan | |
| 2009/0106036 A1 | 4/2009 | Tamura et al. | |
| 2014/0129122 A1 | 5/2014 | Boss et al. | |
| 2014/0258455 A1 | 9/2014 | Julicher | |
| 2016/0149657 A1* | 5/2016 | Kurihara | H04N 21/814 340/539.18 |
| 2017/0169625 A1 | 6/2017 | Lavie et al. | |
| 2019/0129420 A1 | 5/2019 | Yoshizaki et al. | |
| 2019/0158614 A1* | 5/2019 | MacKenzie | H04L 67/535 |
| 2019/0174204 A1* | 6/2019 | Deshpande | H04N 21/23614 |
| 2019/0289370 A1* | 9/2019 | Deshpande | H04N 21/23614 |
| 2019/0369623 A1 | 12/2019 | Sadakiyo et al. | |
| 2020/0152035 A1* | 5/2020 | Kim | H04M 1/72424 |
| 2020/0154257 A1 | 5/2020 | Kim et al. | |
| 2020/0324778 A1 | 10/2020 | Diamond et al. | |
| 2021/0080943 A1 | 3/2021 | Iwamoto et al. | |
| 2021/0225092 A1 | 7/2021 | Lei | |
| 2021/0380022 A1 | 12/2021 | Kanitz | |
| 2022/0070034 A1* | 3/2022 | Nakada | H04H 20/426 |
| 2022/0095018 A1* | 3/2022 | Richman | H04N 21/458 |

* cited by examiner

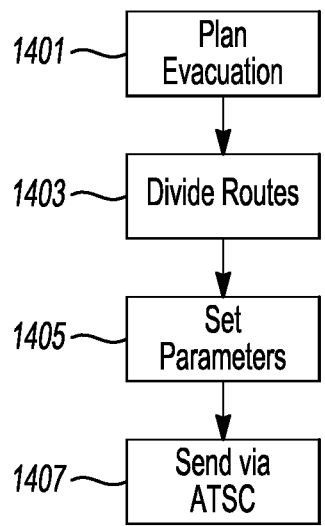
_Fig-14_
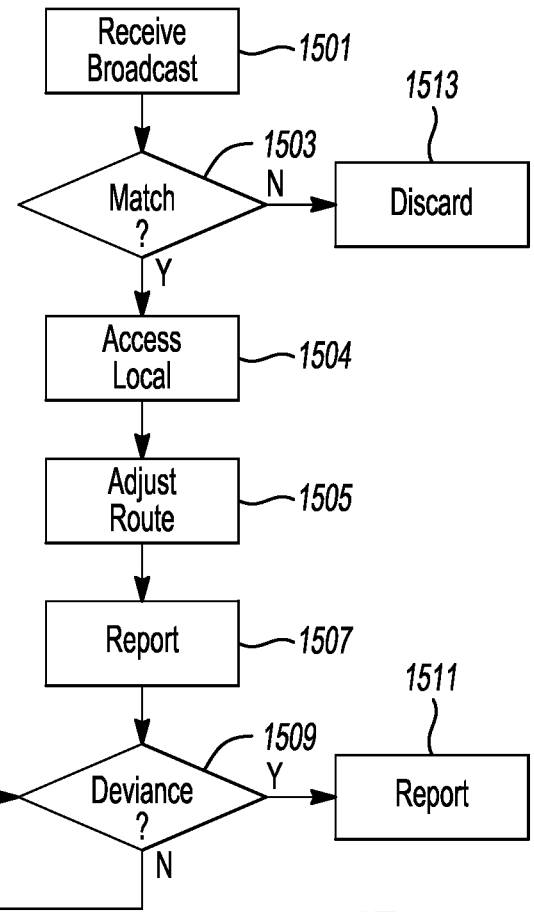
_Fig-15_
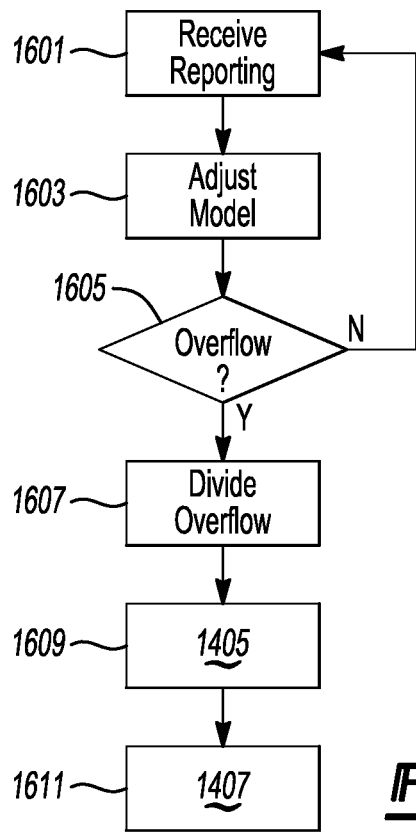
_Fig-16_

METHOD AND APPARATUS FOR AUTONOMOUS FLEET HANDLING USING BROADCAST GUIDANCE

CROSS-REFERENCE TO RELATED APPLICATIONS

This application is a continuation of U.S. application Ser. No. 17/115,981 filed Dec. 9, 2020, now U.S. Pat. No. 11,412,479, issued on Aug. 9, 2022, the disclosure of which is hereby incorporated in its entirety by reference herein.

TECHNICAL FIELD

The illustrative embodiments generally relate to methods and apparatuses for autonomous fleet handling using broadcast guidance.

BACKGROUND

Connected vehicles have the capability to both send and receive data. In many instances, this is achieved via a direct one-to-one connection, where a vehicle establishes a connection with a remote server and receives or sends useful data (map update, software update, etc). In instances where the connection is facilitated using cellular services, for example, this can incur a high data cost in the aggregate when a distributor of the data (e.g., an Original Equipment Manufacturer (OEM)), has to send the data to a large number of vehicles.

Advanced Television System Committee (ATSC) 3.0 technology allows for using a TV frequency to broadcast data and then various vehicles or other entities can receive the data as part of a broadcast. This provides a one-to-many opportunity, but typically does not involve intended direct communication with a single entity. That is, the information is part of a broadcast, and then the receiving entities must receive and process the data included in the broadcast, when the data may not have been intended for a given receiving entity or may be non-applicable to that entity.

SUMMARY

In a first illustrative embodiment, a system includes a processor configured to determine that two-way communication to a plurality of autonomous vehicles has been lost, during conditions predefined as suitable for using the autonomous vehicles for evacuation purposes. The processor is also configured to determine one or more evacuation points and determine a geographic perimeter around each evacuation point, the perimeter projected to encompass sufficient vehicles to service the evacuation point based on determined evacuation needs of a given evacuation point. Further, the processor is configured to formulate an evacuation instruction for each evacuation point, each instruction having one or more parameters, including at least the geographic perimeter corresponding to a given evacuation point, wherein a given evacuation instruction instructs vehicles executing the instruction to travel to the corresponding evacuation point. The processor is additionally configured to instruct broadcast of one or more of the evacuation instructions from an ATSC transmitter known to cover a geographic region including at least a portion of the geographic perimeter of each evacuation instruction transmitted.

In a second illustrative embodiment, a system includes a processor configured to determine that two-way communication has been lost with a plurality of disconnected vehicles, representing a loss of communication over at least one cellular network for at least a given area or a loss of communication correlated to at least one disconnected cellular access point name. The processor is also configured to determine the at least one cellular network or disconnected access point name over which communication has been lost, responsive to determining that two-way communication has been lost. Additionally, the processor is configured to determine a communication alternative for the plurality of disconnected vehicles, representing at least one replacement network or replacement access point name, based on whether communication was lost over the at least one cellular network or at least one disconnected access point name. The processor is also configured to instruct broadcast of the communication alternative as part of a reprogramming instruction from the ATSC transceiver.

In a third illustrative embodiment, a system includes a processor configured to determine evacuation needs for a plurality of evacuation points. The processor is also configured to determine a geographic perimeter, for each evacuation point, encompassing a number of autonomous vehicles projected to be suitable for servicing evacuation of a given evacuation point. Further, the processor is configured to formulate an evacuation instruction for each evacuation point, including the geographic perimeter determined for each evacuation point as a parameter for accepting a given instruction and instruct broadcast of the evacuation instructions from an ATSC transmitter.

BRIEF DESCRIPTION OF THE DRAWINGS

FIG. 14 shows an illustrative process for selective traffic routing;

FIG. 15 shows an illustrative process for selective traffic routing handling;

FIG. 16 shows an illustrative process for adjusting an adaptive selective traffic routing model;

DETAILED DESCRIPTION

Figure 1:
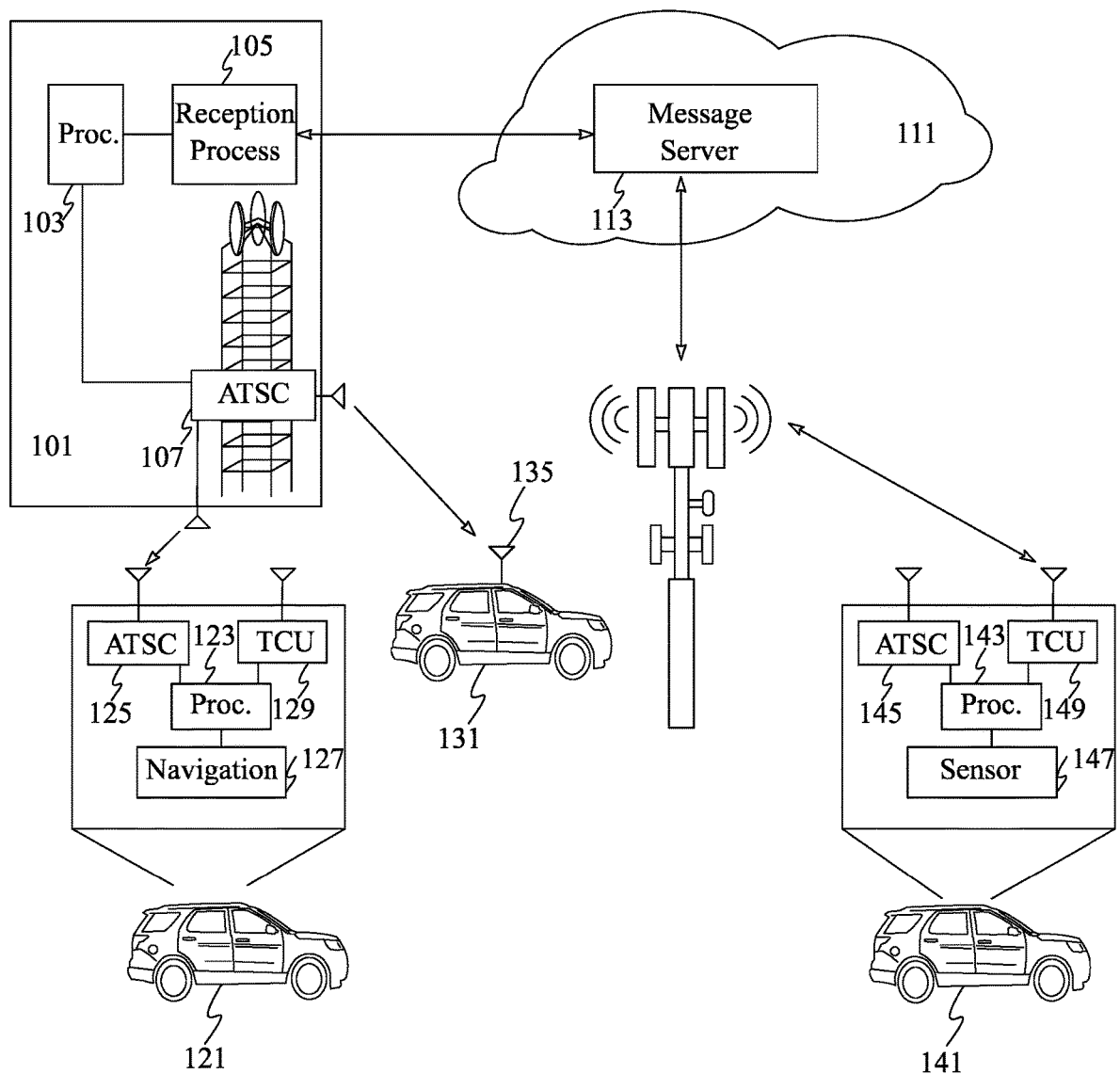
FIG. 1 shows an illustrative ATSC system in communication with a cloud server and multiple vehicles.

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Using a server in conjunction with ATSC television stations, a broadcasting entity (e.g., OEM) can prepare and send targeted data designed to reach multiple vehicles within a station's broadcast range, in a one-to-many fashion. That is, instead of delivering the data to each vehicle individually via a direct connection with a given vehicle, the entity can prepare data that is useful for a designated group of vehicles and send the data and instructions to broadcast to an ATSC station. The station can then send the ATSC broadcast and a large number of vehicles can receive the data at the same time.

Since the data may only be applicable or relevant to a subset of receiving vehicles, the server can also prepare information indicative of the vehicles to which the data applies. For example, if the data relates to a road anomaly, the server can designate a coordinate range around the anomaly, or a time of day when the anomaly is applicable, etc. If the data relates to a software update, the server can designate a software version, or even set of specific vehicle identification number (VIN) or electronic serial number (ESN) elements.

When a vehicle receives the broadcast, it can check parameter data associated with the broadcast to determine the applicability of the data contained in the broadcast. If the parameter data indicates that the vehicle can use the broadcast data, then the vehicle can process the broadcast or send it to the proper internal system (update process, nav system, etc.) for handling.

Through the illustrative embodiments and the like, significant cost savings for communicating data to a large group of vehicles can be achieved, as well as speeding up delivery via the broadcast to all vehicles at once. The broadcast can persist as well, so that vehicles that enter a broadcast area while the broadcast is ongoing may still receive and benefit from the broadcast.

FIG. 1 shows an illustrative ATSC television system 101 in communication with a cloud 111 server 113 and multiple vehicles 121, 131, 141. In this example, the ATSC system 101 is an ATSC television station, capable of sending ATSC broadcasts to a known broadcast area. The station includes some form of process 105 for receiving updates, which is commonly connected to a wide area network (e.g., the Internet), but which also may utilize a cellular or other connection. Through the process 105, the station 101 receives instructions from the cloud 111 server 113 and processes those instructions to devise a broadcast, at station computer equipped with a processor 103. Once the broadcast is ready, the processor 103 can instruct the ATSC transmitter 107 to send out the broadcast to any vehicles 121, 131 within a reception area.

In the example shown, any one of the vehicles 121, 131, 141 may report an anomaly to the cloud 111 server 113 via cellular connection or other connection. In some instances, such as vehicle 141, the vehicle may include a sensor suite 147. These suites may be more common in autonomous vehicles 141, which may include a variety of detection systems that are not provided to other vehicles 121, 131.

In other instances, the vehicle may be a human-driven vehicle 121, 131, and may include a processor 123, an ATSC transceiver 125, a navigation process or processor 127 and other onboard processes or processors, and a telematics control unit (TCU) 129. If and when the vehicle 121 detects an anomaly, such as an onboard software error, the vehicle 121 may report the anomaly to the server 113 using the TCU 129 and a cellular connection, or other direct connection (e.g., Wi-Fi). FIG. 1 shows vehicle 141 communicating cellular data through TCU 149, through a cellular tower, to the cloud server 113. This vehicle 141 could be reporting anomalies detected through sensors 147, traffic, software errors, etc. Any vehicle can potentially communicate an anomaly to the cloud 111.

Vehicle 131 has similar components to vehicle 121 but is shown as a simple vehicle 131 for the sake of demonstrating that the broadcast from the station 101 ATSC transmitter 107 is one-to-many. The antenna shown in the example is an ATSC receiver 135.

Vehicle 141 is an autonomous vehicle or other vehicle with enhanced sensors 147 and may also detect a variety of road-based anomalies (e.g., potholes). Other vehicles 121, 131, may also detect traffic and road anomalies (e.g., traffic, construction), but may not be as well equipped to detect things like potholes. When the vehicle 141 detects a road condition that should be shared with other vehicles 121, 131 (based on a predefined set of what detected conditions should be shared, for example), the vehicle 141, which also has a TCU 149 and a central processor 143, can use the TCU 149 to report the condition to the server 113 via a cellular connection. This vehicle 141 also has an ATSC receiver 145 for receiving ATSC broadcasts from the ATSC transmitter 107 or the like.

The server 113 receives any reported anomalies and determines which vehicles may be impacted by the anomalies and/or how to fix the anomalies if the anomaly is something that can be fixed (e.g., a software update). The server 113 then packages delivery instructions, along with any parameters usable by vehicles 121, 131, 141 to determine if a received broadcast is applicable, and then the server 113 delivers the data package to the station 101. The station 101 can then send the data package to the various vehicles 121, 131, 141, which can individually determine the applicability of the data.

Since the data may include an update to software, even a reporting vehicle 121, for example, may benefit from the data. In other instances, the receiving vehicle 141 may receive the data and confirm, based on the fact that the data/solution was received, that a road or traffic anomaly was successfully reported.

Figure 2:
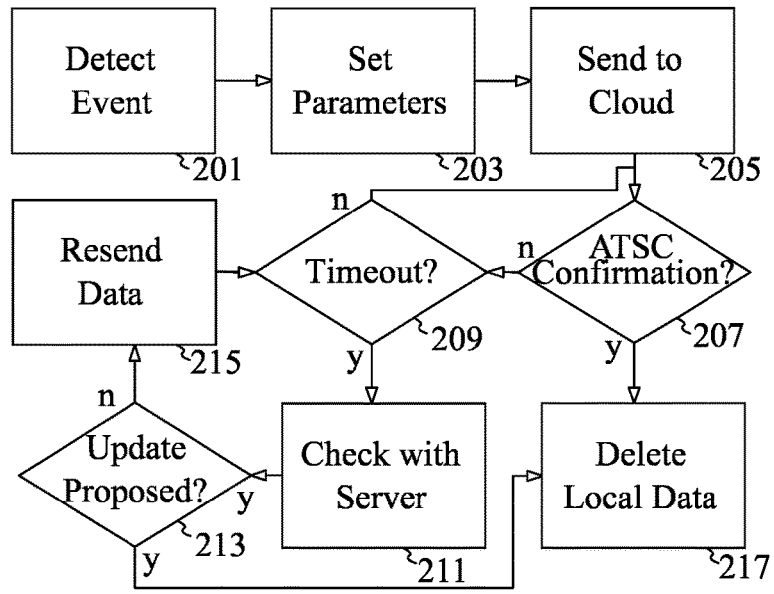
FIG. 2 shows an illustrative process for detecting and reporting an anomaly.

FIG. 2 shows an illustrative process for detecting and reporting an anomaly. In this example, the process executing on a vehicle 141 processor 143 detects a reportable event at 201. This can include, for example, a road anomaly, a traffic anomaly, a change to a road (new road, road closure, etc), a software failure or other predefined reportable event.

If there are any parameters associated with the anomaly, the vehicle 141 may set the parameters at 203. For example, the road anomaly may have geographic coordinates associated therewith, as well as a heading or time of day. A software anomaly may have parameters like a software type or version associated therewith, as well as parameters corresponding to particular vehicle systems that utilize or include the software. The vehicle 141 then sends the anomaly and parameters to the server 113 at 205. The server 113 may also report to the OEM, which may then prepare a software fix to address the reported issue. If the software fix was not already pending, the OEM may take some time to solve and release the solution to the reported issue.

Because the sending of the parameters may cause an ATSC update to be sent, in this example, the vehicle 141 determines if an ATSC update has been received via ATSC receiver 145 at 207. This could be a report of the road anomaly or a software update to fix an identified problem. Since the update or report could take a while to process, the vehicle 141 can wait at 209 and continue to check for the ATSC update. Or, the vehicle 141 may simply receive the ATSC update once it is available, without repeat checking.

If the prescribed time-period passes, it is possible that an error has occurred preventing the ATSC update or the software fix is not available yet. Accordingly, in this example, the vehicle 141 communicates directly with the update server 113 at 211. If the server 113 notifies the vehicle 141 that the update has been processed at 213, the vehicle 141 can delete the local data for reporting the anomaly at 217. The same deletion can occur when the vehicle 141 receives the ATSC update that it expects based on the sent data. In other examples, when the vehicle reports an anomaly, it may simply delete the data and the server will address the anomaly in due time. In such an example, the vehicle will not need to receive an update from the server directly and/or check back with the server.

If there was an issue with the update, or the server 113 requires the data again, the vehicle 141 can resend the data at 215 and repeat the process. Since the server 113 may take time to handle the update and may take further time to send the update via the station 101, the vehicle 141, in this example, disconnects without necessarily receiving initial confirmation of update handling, since the vehicle 141 may still receive the ATSC broadcast as confirmation once the update has been processed.

Figure 3:
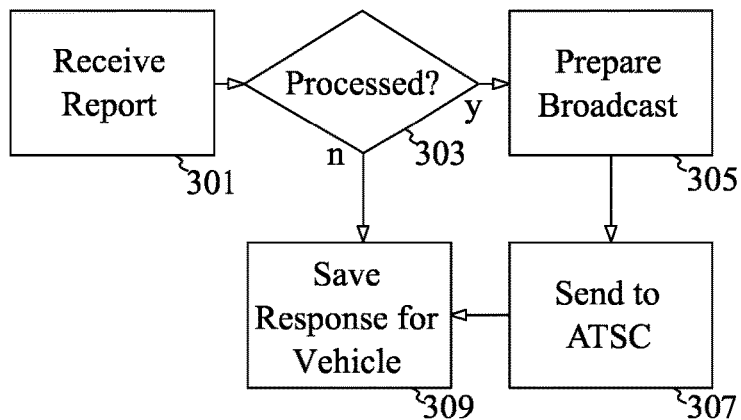
FIG. 3 shows an illustrative process for reported-anomaly handling.

FIG. 3 shows an illustrative process for reported-anomaly handling, executed by, for example, the server 113. In this example, the server 113 receives the report of the anomaly at 301. Because more than one vehicle 121, 131, 141 may report the same anomaly, especially with regards to road and traffic anomalies, the server 113 determines at 303 if the anomaly was already processed (i.e., previously received). If the anomaly was already processed, the server 113 saves a report for the reporting vehicle at 309, in case the vehicle 141 communicates with the server to determine if the report was processed.

If the report was not already processed, the server 113 will process the report and set parameters at 305 that correspond to which vehicles to which the update/broadcast applies. This can also include obtaining a software update for distribution, identifying vehicle parameters for a software update, defining a geo-fence around a road anomaly, etc. The server 113 may further include a duration for the broadcast and/or applicable times-of-day and day-of-week for the broadcast, and then the server 113 sends the instructions and data to the ATSC station 101 at 307.

Figure 4:
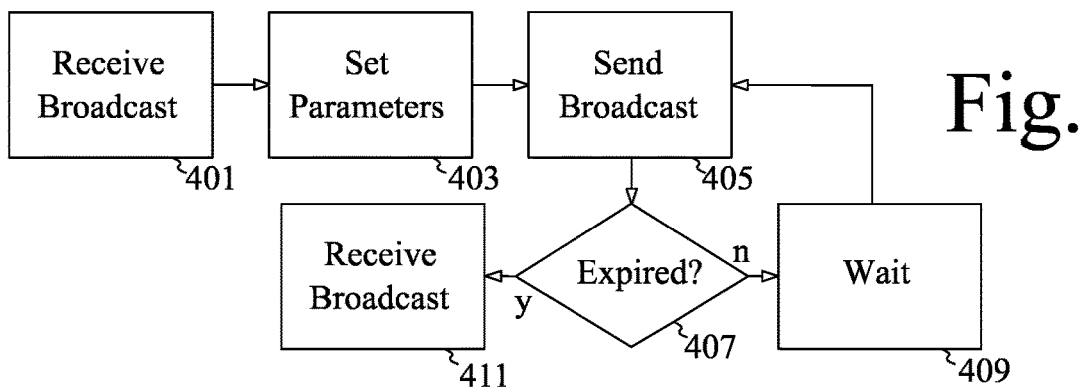
FIG. 4 shows an illustrative process for sending an ATSC broadcast.

FIG. 4 shows an illustrative process for sending an ATSC broadcast, executable by, for example, the station 101. In this example, the station 101 receives the broadcast data and any applicable parameters from the server 113 at 401. Since the data may need to be converted for broadcast, such as including a broadcast header file, the station 101 may set any receipt parameters that are to be included in the header file at 303. This can include, for example, geographic parameters, heading parameters or vehicle VIN or ESN parameters.

The station then sends the data as part of an ATSC broadcast at 405. If the broadcast has a defined time period, that has not expired at 407, the station 101 may wait a predefined period of time at 409 and then resend the broadcast. Because the station 101 may be asked to broadcast a large number of data sets, the station 101 may require a wait period between broadcasts, which may also be defined in relation to a type of broadcast—e.g., an emergency broadcast will be ongoing until the emergency abates, but a pothole notification may only be broadcast every X minutes unless no other broadcasts are pending. Once the predefined time period expires, or once the anomaly abates, the station 101 may remove the broadcast from a queue of broadcasts at 411.

Figure 5A:
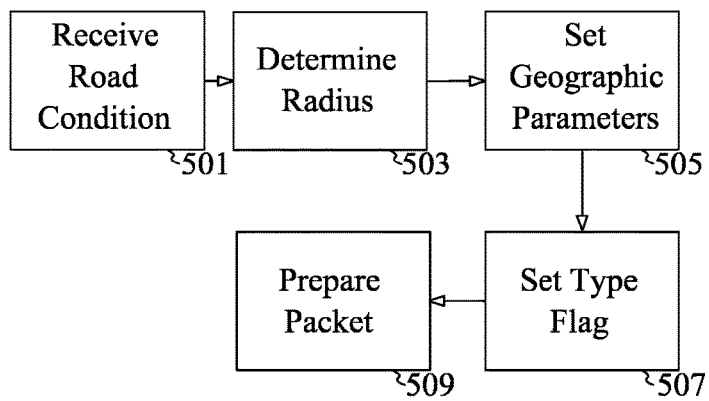
FIGS. 5A and 5B show illustrative processes for preparing broadcasts on various illustrative anomalies.
Figure 5B:
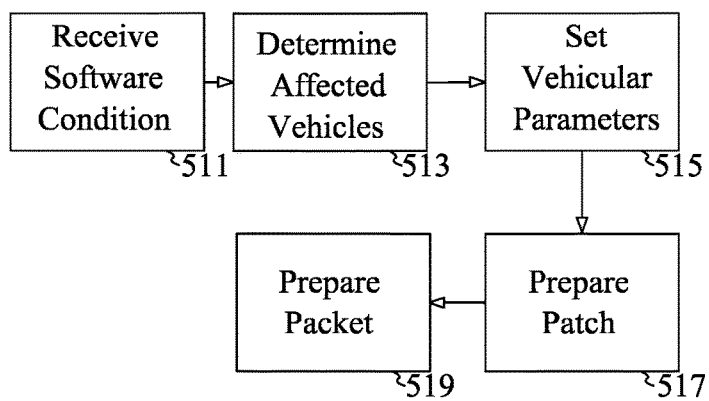

FIGS. 5A and 5B show illustrative processes for preparing broadcasts on various illustrative anomalies, executable by, for example, the server 113. When the server 113 receives a given anomaly, the server 113 may parameterize the anomaly to define which vehicles 121, 131, 141 should actually process a data broadcast sent by the station 101. While illustrative road anomalies and software anomalies are show in FIGS. 5A and 5B respectively, it is appreciated that any sort of anomaly that could be detected, defined for reporting and for which reporting to multiple vehicles could be suitable handled in a similar manner.

In FIG. 5A, the server 113 receives a report of a road anomaly at 501. This can include, for example, a road hazard (pothole), a new road, a road closing, a construction zone, a dangerous condition, a weather condition, etc. In this example, the server 113 determines an applicable geofence radius (or perimeter) at 503. For example, a pothole may have a constrained perimeter of a mile and directionality associated therewith (given the likely limited impact on most traffic), while a massive construction detour could have a radius of 5-10 miles associated therewith, giving drivers time to change a route prior to reaching any backup.

The server 113 then sets any geographic parameters to be associated with the anomaly at 505. This can include, for example, directionality, boundaries for processing, and any other pertinent information. For example, with a pothole, not only may the radius be set at 0.5 miles, but the server 113 may also set a specific road parameter, so that only vehicles within a half mile of the pothole, traveling in a specified direction, and on the given road, will process the data relating to the pothole.

The server 113 may also set a type-flag at 507, defining a type of anomaly (which will then be included in the broadcast). Certain vehicle owners may want to ignore certain reporting, to avoid over-inundation, so, for example, if the anomaly is of type weather and rain, some vehicle owners may ignore this anomaly (not caring if they drive through rain) while others may not.

The server 113 then prepares a data package at 309, which can include identification of the anomaly as well as any processing-parameters, and any suggested action for avoidance of the anomaly. This can be a detailed plan or can be as simple as, for example, "avoid traveling in leftmost lane between 11 and 12 Mile Roads on Telegraph Rd., to avoid a pothole." When the anomaly is large, navigation systems may be able to route around it, but when the anomaly is highly localized, GPS coordinates may be insufficient to determine a vehicle location relative to the anomaly, and thus the server can provide additional instructions to avoid the localized anomaly.

In FIG. 5B, the server 113 receives reporting of a software anomaly at 511. This can include, for example, a software glitch, error in a display, or other reported software error. The error report may also include a software version and/or a vehicle system to which the software applies (e.g., software error in version 1.02 of Heating Control Software for Heated Vehicle Seat Module).

The server 113 then determines whether there is a patch or update available at 513. Even if there is not a patch, the server 113 may report the error to vehicle owners via email or other methods who have the affected software version installed, which the server 113 can also determine at 513. The server 113 can then set vehicle parameters at 515, such as vehicles having the particular module and/or software version. This could also include a VIN or ESN parameter indicating a set of vehicles, if the vehicles to which the update applied were identifiable through such identification utilization.

The server 113 can include a software fix or other data usable for obtaining a software update or patching software at 517. If, for example, the software is not fixable via an over the air update, the fix could include instructions (that can be delivered to a vehicle occupant) to schedule a visit to the dealer. Finally, the server 113 prepares the software package for delivery, along with broadcast instructions at 519 and then sends the data to the station 101.

Figure 6:
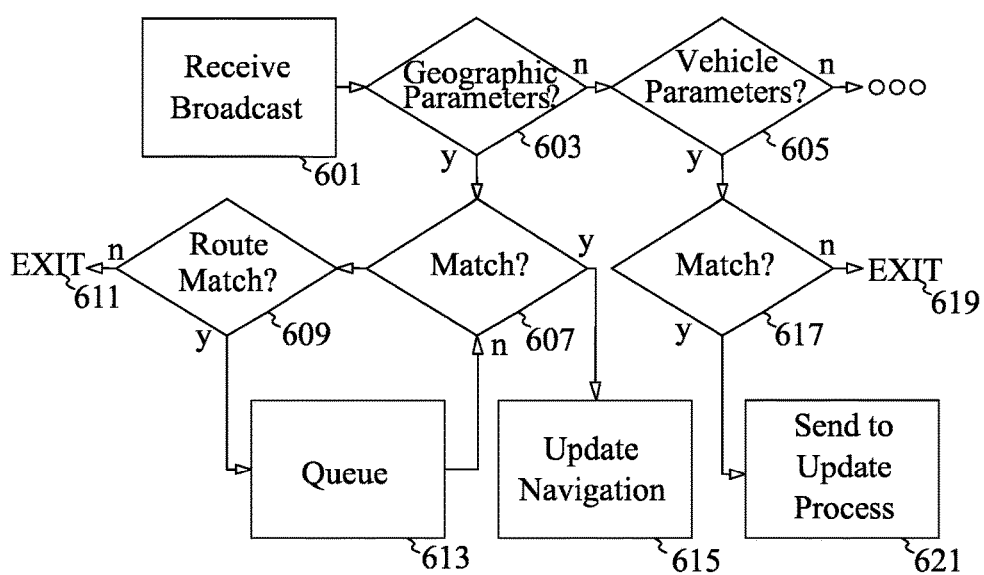
FIG. 6 shows an illustrative example of a process for received-broadcast handling.

FIG. 6 shows an illustrative example of a process for received-broadcast handling, executable by, for example, vehicle 121. In this example, the vehicle 121 receives the ATSC broadcast at 601. Since a vehicle 121 will receive all ATSC broadcasts while it is within a broadcast region, the vehicle 121 may need to have a process for handling the broadcasts, to avoid wasting processing cycles and energy on handling inapplicable broadcasts.

If the broadcast includes geographic parameters at 603, the vehicle 121 treats the data as a traffic anomaly incident. If the broadcast includes vehicle identification parameters or system or software parameters at 605, the vehicle 121 treats the data as a software problem notification. Other parameters could also be used to identify other types of broadcasts as suitable.

If the data is a traffic anomaly, the vehicle 121 determines if the present GPS coordinates for the vehicle 121 match a coordinate set defined for the traffic broadcast at 607. In other instances, a vehicle heading or road may be used for matching, or a determination of whether any applicable coordinates are along a vehicle route. If there is a current match (i.e., the broadcast immediately applies to the vehicle), the vehicle 121 sends the updated data to the vehicle navigation system at 615.

If there is not a current match, this does not guarantee that the data will not ever apply to that particular vehicle, since the data relates to a proximate road condition and the vehicle is traveling. Accordingly, the vehicle 121 determines if a present route (or heading and road) will carry the vehicle 121 within the relevant coordinate set. If there is a route match at 609, the vehicle 121 can queue the data at 613 for use when the current GPS data matches, or the vehicle 121 can otherwise ignore the data at 611.

If the data pertains to a software update, the vehicle 121 determines at 617 if the vehicle 121 includes the relevant identified software version or module. If not, the vehicle 121 ignores the data at 619, but if there is a match, then the vehicle 121 sends the data to a software update process at 621 for handling when appropriate. If there is no software, the vehicle 121 may send the data to a notification process, for example, to notify the driver that a fix is needed, but not available over the air.

In addition to the preceding illustrative examples, there are a myriad of other functions that can be achieved based on the one-to-many model of ATSC broadcast messaging. While this model presents certain challenges, because there is no direct reciprocal communication with a receiving entity (although that entity can report-in later), the model also allows for some unique opportunities to cheaply mass-transmit information, data gather, and adaptively manage certain situations where direct one-to-one communication can overconsume bandwidth and/or be cost prohibitive.

Figure 7:
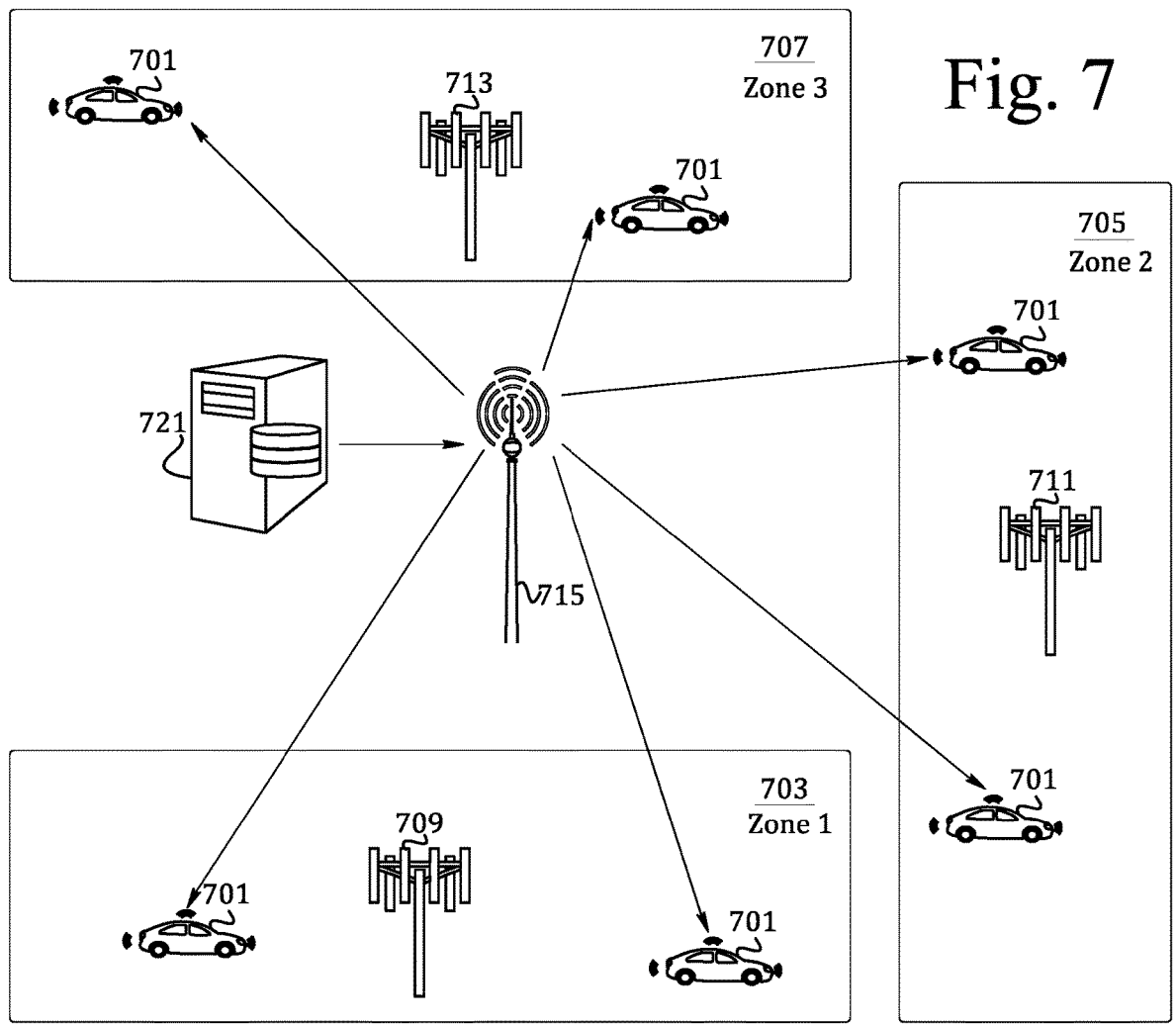
FIG. 7 shows an illustrative example of autonomous vehicles servicing a plurality of zones.

For example, the onset of autonomous vehicles will provide thousands of unmanned vehicles on the roads. FIG. 7 shows an illustrative example of autonomous vehicles 701 servicing a plurality of zones 703, 705, 707 at a time when cellular networks 709, 711 and 713 go down (e.g., due to natural phenomena). Because autonomous vehicles 701 will obtain information and instructions from the cloud, and because that transmission will often be through a cellular communication medium, loss of these networks 709, 711 and 713 will mean complete or partial loss of control over the vehicles 701.

At the same time, as these are unmanned vehicles, they are both highly useful for transport purposes in such a situation, and they can be subjected to greater chances of peril, at least when they do not have passengers, because there will not be people onboard. Thus, loss of cellular communication can provide loss of communication with a fleet of useful vehicles 701 at a time when those vehicles 701 would be some of the most useful vehicles 701 on the roads. And in a situation where most or all vehicles 701 are autonomous, this can mean near loss of an entire fleet of almost all or all vehicles 701 on the roads.

ATSC broadcasting can be used to assist in such a situation, because these vehicles 701 can be instructed to drive to a particular destination of need via direct broadcast from an ATSC transmitter 715. This will often have the effect of deploying vehicles 701 en mass, since cellular networks are down in this scenario, the vehicles 701 may lack the capability to report arrivals or receipt of instructions, but it is also the case that the location of many vehicles 701 will be known just prior to cellular interruption, either based on an intended destination or a current idle state location.

Then, affected areas can be divided into zones 701, 703, 705. Those vehicles 701 in each zone can be assigned a particular task. Further, it is possible to designate zones based on present GPS coordinates, which still may be known to vehicles. In either event, or using both concepts, a subset of vehicles 701 proximate to an evacuation site, for example, can be tasked with traveling to the evacuation site to evacuate people. While this may result in extra vehicles 701 being sent to a given site, out of an abundance of caution and with an expectation that all vehicles 701 may not arrive, the result of over-providing vehicles 701 for evacuation is certainly better than those vehicles 701 sitting idle with no instructions.

As vehicles 701 clear a given site, messaging (e.g., from a human via a radio) can be sent back to be fed into a coordination process executing on a government server 721 or other suitable coordination server), which can repurpose all vehicles 701 headed to, or at, the now evacuated site, and send those vehicles 701 to one or more sites. In this manner, the autonomous vehicles 701 can continue to assist in evacuation and transport even though direct communication with those vehicles 701 is presently unavailable. Since the vehicle 701 may be able to drive and navigate to a destination based on onboard computing and vehicle to vehicle (V2V) and vehicle to infrastructure (V2I) communication, or some subset of this communication if some is unavailable, the lack of cellular communication need not present a complete impediment to autonomous vehicle tasking and travel.

Figure 8:
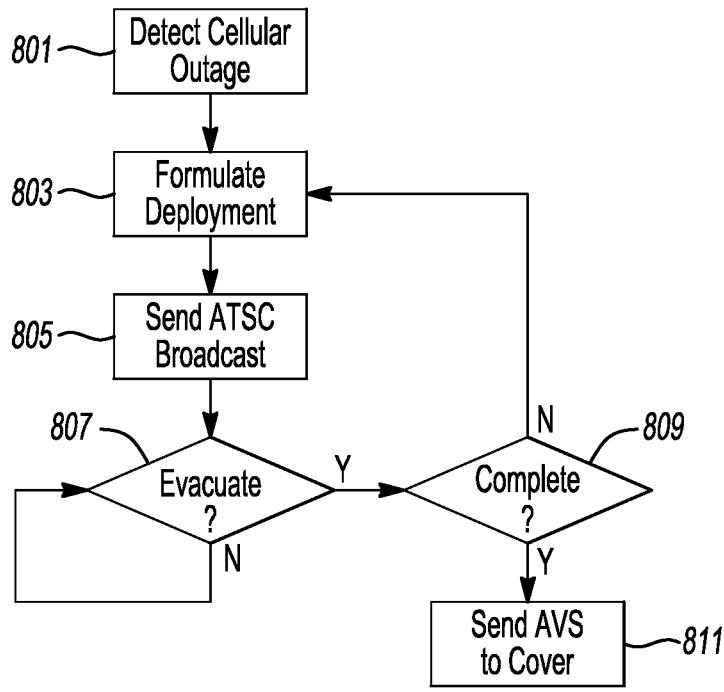
FIG. 8 shows an illustrative process for autonomous vehicle deployment using broadcast.

FIG. 8 shows an illustrative process for autonomous vehicle deployment using broadcast. In this illustrative example, a coordination process is executable by, for example city server 721. The server 721 detects or receives indication of a cellular outage for some or all of an area for which the server 721 is responsible at 801. The server 721 may not normally have control or rights to task vehicles 701 except in an emergency situation, but if a cellular network goes down, and/or if an emergency broadcast is received by a vehicle 701, the vehicle 701 may go into a mode allowing commands from the city server 721 to direct destinations of the vehicle.

If the network outage was due to, for example, a temporary outage, or if the emergency signal was a test, the vehicle 701 accepting such commands would not be a problem, because no commands would be received. Further, vehicles 701 may wait until a current route is complete, or until no passengers remain, prior to state-switching to accept such commands, so there can be additional assurances that a currently occupied vehicle 701 is not retasked while already serving as transport.

If the server 721 is an OEM server or server that already has control privileges, then the coordination of which vehicles 701 to retask can be done based on a knowledge of which vehicles 701 were already under use or tasked with a pickup. The city server 721 could have access to such a feed as well, if desired, and so could further ensure that no under-use vehicles 701 were repurposed until a suitable time (e.g., no passengers present).

The server 721 then can formulate a deployment strategy based on, for example, known evacuation areas. This can include any sort of reasonable prioritization, that would commonly be the purview of the planners for evacuation scenarios. Formulation of deployment at 803 can include, for example, defining geo-fences around known evacuation points, to ensure a suitable number of known vehicles 701 will receive a given command to assist. In some instances, this can be done based on total vehicle locations (e.g., set the geofence at a perimeter based on encompassing the 50 closest vehicles 701 to the location requiring 40 vehicles), and in other instances this may be an assumption based on typical vehicle density if the exact locations of all vehicles 701 is not or cannot be known (e.g., typically 10 vehicles 701 per block in a city, set the fence at a 2×2 block grid with the evacuation point at center and assume approximately 40 vehicles 701 will be available).

Formulation of the fences is a dynamic process that can be repeated as various points become evacuated. Certain vehicles 701 may be dispatched to further points, and this tasking can even come from a zone or geofence not within the fence for those points. For example, some subset of vehicles 701 can be instructed to begin travel to a further point that may otherwise lack vehicles.

Despite all vehicles 701 within a fence receiving the same message based on being within the fence, this retasking could be achieved by a relatively simple process. For example, vehicles 701 with certain characteristics (e.g., high capacity, high fuel range, off-road capability) could be sent to remote regions and would receive this different command based on the vehicle 701 characteristic as well as the geographic characteristic of being within a geofence.

In another example, there could be projected or known to be 200 vehicles 701 in an area that only needed 100 vehicles 701 at evacuation point A, and there were some outlying areas that had only 20 vehicles 701 but needed 30 vehicles 701 each at evacuation points B and C.

One option could be to send all 200 vehicles 701 to evacuation point A and then repurpose those vehicles 701 unused after the evacuation was complete at point A. This would involve sending far more vehicles 701 than needed, however, to the evacuation point A. An alternative solution, by way of example only, would be to send an instruction set to the 200 vehicles, where the instruction included two alternative locations B and C and an instruction for a given vehicle 701 to run a randomizer.

Assume that it was deemed acceptable to send 150 vehicles 701 to the larger evacuation point A (in case some vehicles 701 were unable to make it) and 25 each to the outlying points B and C. This would give each point 150% of the vehicles 701 needed, heading to a respective location.

In this example, each vehicle 701 could randomize between 1 and 4. If the vehicle 701 produced a 1 or a 2, it would follow the primary instructions to the large evacuation point A, if the vehicle 701 produced a 3 it would go to point B, and if it produced a 4 it would go to point C. This would generally result in a rough approximation of the correct number of vehicles 701 going to each point. Randomization would probably result in some variances (e.g., 154 vehicles 701 to A, 52 vehicles 701 to B, 44 vehicles 701 to C), but at larger numbers of vehicles 701 this would flatten out, and each location is already being sent 150% of the need in the first place, so some variance should still have the correct number of minimum vehicles 701 headed to a given location.

This allows for some granularity of control even though direct control of the vehicles 701 cannot be achieved. Further, if the large zone (200 vehicle zone) has vehicles 701 distributed all throughout, vehicles 701 closer to B or closer to C could be exempted from achieving the further result. This would be achieved by, for example, instructing a vehicle 701 that if it produced C as the destination based on randomization, but was in a "no-C choice" fence, it would re-randomize or be assigned to specifically A or B instead. B may be a better choice, since the likelihood of a false positive for B or C would be the same (25%) and thus an equal percentage of vehicles 701 in each region would produce false positives but effectively swap their destinations without any direct control or knowledge of the other vehicles.

Weighting or other constraints could be used to vary the randomness, so that vehicles 701 in the large zone that were also closest to B had the highest chance of randomizing to B, and the same with C. The ATSC instructions do not even need to know where vehicles 701 are actually located to achieve this, it can just assign weighted based on present GPS coordinates, so a given vehicle 701 can determine the correct weighting for that vehicle 701.

More accurate control can be achieved when more information about vehicle locations is precisely know, but in certain weather-related situations, or even in urban canyons, it may have been difficult to know precisely where each vehicle 701 was located prior to losing contact, and thus simply knowing that 200 vehicles 701 are in zone A could be sufficient information to use some of the techniques, and the like, provided herein.

If the exact location of every vehicle 701 was known, then the server 721 could simply redraw the zones to place the correct number of vehicles 701 in the zones servicing B and C (e.g., extend the zones around B and C to encompass those particular vehicles.

After formulating a planned deployment, including any variations such as the preceding and the like, the server 721 can instruct the ATSC transmitter 715 (or station servicing the transmitter) to broadcast instructions for vehicles 701. Using the preceding example of evacuation points A, B and C, and corresponding zones A, B and C, the instructions for all zones could be included in the transmission. Since the instructions can be addressed based on GPS coordinates of a given vehicle 701, each vehicle 701 will receive all instructions and simply discard the irrelevant instructions (or save them in a queue for consideration after a current instruction set is complete). Choosing which instructions to follow can be based on parameters such as GPS coordinates, vehicle 701 characteristics (capacity, fuel range, off-road capability, body color, etc.) or other reasonable parameters tied by server 721 to a given set of instructions. If a vehicle's state set (the preceding parameters and the like) matches those assigned to a set of instructions, those are the instructions the vehicle 701 will execute.

ATSC transmission can continue periodically, and when a site (e.g., A) has completed evacuation at 807, the server 721 can formulate a new deployment based on all vehicles 701 now available that either didn't need to service A or have completed drop-off of evacuees. The feedback may need to come from someone at site A, or through another indicator, but the server 721 can incorporate this feed back and send a new instruction set, which can include a redesignation of zones as needed. Any vehicles 701 to which the new instructions apply, which are not current evacuating people (i.e., have passengers onboard), can execute the new instructions based on parameter matching as above. This can give a measure of fleet management even though direct contact with the fleet may be lost. When all evacuations are indicated as being completed at 809, the server 721 can formulate and send a set of instructions that send vehicles 701 to suitable cover for the duration of the lost contact.

Certain cover locations, such as designated covered parking, may provide localized direct communication with the vehicles 701 sheltering there, and this can allow the server 721 to reassess resource allocation within an area, if those vehicles 701 are again needed prior to the cellular networks 709, 711, 713 coming back online. Since the localized communication provides direct communication, the server 721 can send each vehicle 701 a specific instruction set initially (when redeploying the vehicles 701) and then the ATSC transmissions can resume until the vehicles 701 are again sent back to cover.

It is also possible that multiple ATSC transmitters cover different regions, and selection of which instructions to transmit via which transmitters can be based on a correlation of geographic perimeters associated with instructions as compared to known areas of coverage of a given ATSC transmitter. This could result in some overlap of transmission, but the vehicles 701 will be ultimately deciding which instructions to follow, and so receiving duplicate instructions should not present a significant challenge. This can be even more mitigated by having any vehicle 701 with an already assigned task ignore other instructions until either that task is complete or an instruction with, for example, an override parameter is received, indicating that the vehicle 701 should drop a present task and execute the override instruction.

Figure 9:
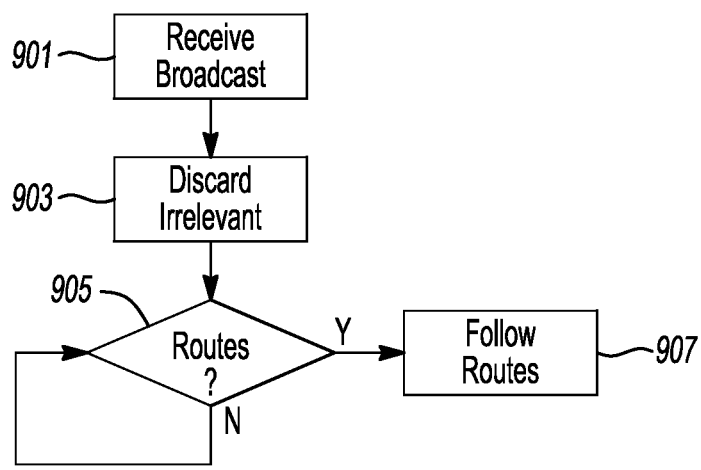
FIG. 9 shows an illustrative process for deployment handling.

FIG. 9 shows an illustrative process for deployment handling executable by, for example, a vehicle 701. As previously described, a given vehicle 701 may receive an ATSC broadcast at 901 that includes more instructions than those that are intended for the given vehicle 701. The server 721 may have assigned a parameter set (one or more) to each instruction set, and the vehicle 701 can consider various parameter sets compared to its own state set (e.g., location, characteristics, even fuel or other dynamic characteristics) to decide which instructions to execute based on matching parameters.

Instructions can even have parameters based on, for example, travelable distance remaining. Using the points A, B, C example, if a vehicle 701 was in zone A and was told to travel to point C, but had insufficient travelable distance remaining, the vehicle 701 could disregard that instruction and re-select an instruction that was the closest match other than C (B or A).

The server 721 may not tie parameters such as travelable distance to the initial choice of an instruction set, because the server 721 will not know how far a given vehicle 701 is from an evacuation point. But once the vehicle 701 has selected the set, the vehicle 701 can make that determination by knowing the evacuation point, its present location and an eventual destination. In another option, the selection parameter could accommodate this, by providing the vehicle 701 with evacuation and destination coordinates (where the evacuees are dropped off) and the vehicle 701 will have instructions to use this coordinate pair to determine whether the vehicle 701 can complete such a journey prior to selecting that instruction set.

The vehicle 701 can discard or queue instructions that are not presently being executed at 903. If the presently accepted instruction includes one or more routes to be executed by the vehicle 701 at 905, the vehicle 701 will execute those routes at 907. Some vehicles 701, for example, may receive an instruction to stay in place, leaving them as a resource for any local needs that arise, without depleting their fuel supply by sending them too far afield for remote (from that vehicle's perspective) evacuation points.

Figure 10:
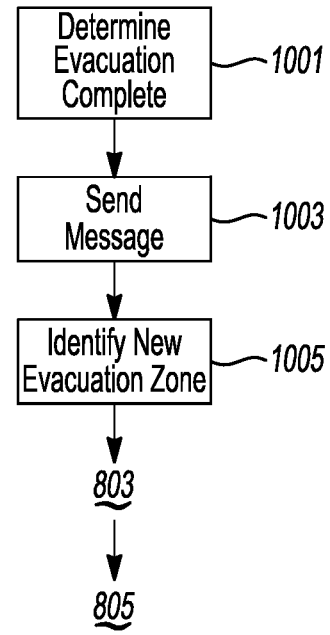
FIG. 10 shows an illustrative process for repurposing deployment.

FIG. 10 shows an illustrative process for repurposing deployment. As previously noted, when evacuation of a given evacuation point is complete, some form of feedback can be used to inform the server 721 that the evacuation is complete at 1001. This can include, for example, radio communication between two humans, one of whom inputs the data into a server, radio communication to the server 721 indicating that evacuation is complete (e.g., voice recognition, coded transmission, etc), or even one or more vehicles 701 reporting success if those vehicles 701 travel into a zone where cellular communication still exists and direct communication with a vehicle 701 can again be achieved.

At this point, the server 721 may need to formulate a new evacuation plan to accommodate remaining evacuation points. Since the server 721 may have send a plurality of extra vehicles 721 to the evacuation location, the server 721 may send a brief cessation instruction to the vehicles 701 in a given zone, which can cause those vehicles 701 to wait in place, as opposed to having them all continue traveling to the evacuation point. Whether or not to do this can be determined based on, for example, whether it is easier to redeploy these vehicles 701 based on assumptions about their present location or the knowledge that they are all starting at the known evacuation zone location.

In such an instance, vehicles 701 may be programmed to ignore new instructions while executing a present instruction (because the vehicle 701 does not know that the evacuation is complete). In this case, the instruction can be an override instruction, which is received by all vehicles, accepted by vehicles 701 in a given zone, and then executed (instead of being queued or discarded) based on the override parameter, which would not have occurred in the absence of the override parameter, wherein the instruction would have otherwise been queued or discarded.

While the vehicles 701 wait (if needed), the server 721 identifies new or other evacuation zones or points for vehicles 701 to travel to, at 1005, and then formulates a new evacuation plan at 803 (similar to 803) and transmits this plan at 805.

Figure 11:
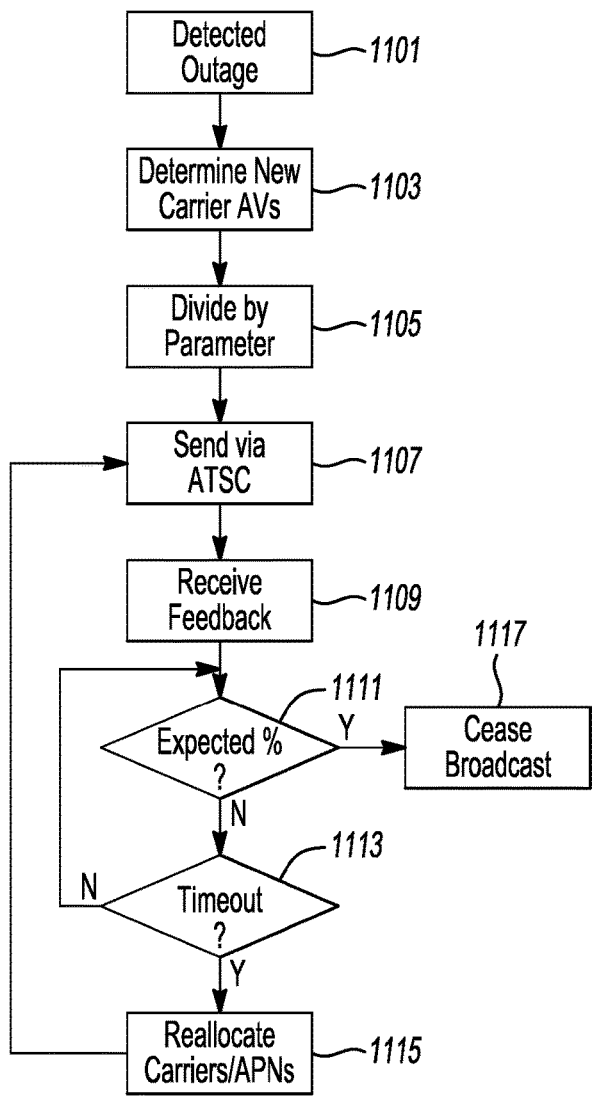
FIG. 11 shows an illustrative process for cellular provider provision using broadcast.

FIG. 11 shows an illustrative process for cellular provider provision using broadcast. This process could be executed by a server 721, although in this instance the process would more commonly be executed by an OEM server 721 than a city management server. For the sake of illustration, however, it does not necessarily matter who provides the sever, but simply that a server 721 in communication with an ATSC transmitter 715 (or a controller of the transmitter) can instruct transmission of the various instructions and requests discussed herein.

In this example, the server 721 will distribute cellular profile reprogramming instructions responsive to a detected failure in one or more cellular networks. So, for example, in the preceding example of a weather-related incident that disables one or more cellular networks, prior to using ATSC technology to send instructions to vehicles 701, the server 721 (or another server) may attempt to execute a process such as this example or the like, in order to maintain direct control over vehicles 701 if possible. While not a necessary step prior to sending ATSC evacuation instructions, direct control over vehicles 701 can make it easier to route those vehicles 701, so if a simple attempt to reconfigure lost cellular connections can be attempted while the server 721 formulates an evacuation plan, for example, it may be worth sending out in some instances.

In cellular networks, certain failures can occur, which include, for example, routing from a network A to a backend server, complete failure of network A requiring use of another network B, etc. This problem has been previously recognized, and proposals to address this problem typically involve using a diminishing signal on A to receive new information about B, allowing a vehicle 701 to transition when the signal on A becomes unusable. The problem with such a solution is that if network A is suddenly and unexpectedly lost (e.g., a tower is knocked down or disabled), there was no planning and therefore the vehicle 701 is simply left without a connection.

Because the vehicle 701 lacks an active connection, the vehicle 701 has no way to request reprogramming or any other communication, or even inform the network that it lost connection (as opposed to was simply parked and powered down, for example). Thus, in unexpected disconnection and network-disablement situations, for example, the previous systems of planning in advance for a disconnect, based on a diminishing signal, or even an upcoming known signal loss, will not provide much useful support.

When the server 721 detects or is notified of a network outage at 1101, in this example, the server 721 can also determine or be notified as to what type of error has occurred. For example, the server 721 can be notified if the error was due to a disabled network, or due to routing between the radio network and the backend malfunctioning. In the former example, the server 721 will determine a new carrier, and in the latter example, the server 721 will determine a new access point name (APN) for the same network, which allows for different routing if the prior connection between the radio network and backend was malfunctioning. These are determined at 1103 and can include all vehicles and not simply AVs.

In order not to overload a new network, for example, the server 721 may determine a plurality of alternatives for a lost network, so that all network traffic is not immediately shifted to a new network. In such an instance, the server 721 will divide the new network profiles based on a parameter at 1105, as before. This can be based on, for example, areas of coverage that have better or worse different networks (e.g., network D spans coverage areas of networks E and F, network D goes down, the server 721 can instruct vehicles 701 in areas better serviced by E to use E, and the same with F). The parameters can also include, for example, a parameter that the vehicle 701 primarily used, or was previously connected to, network D (or whatever network had the error being rectified). This can include, for example, the server 721 broadcasting new network profiles to vehicles in geofenced areas to switch to a new network assigned for an area. Each geo-fence can have a new network and profile assigned thereto, and this can accommodate vehicles that are otherwise unaware of a given alternative network and which otherwise lack a profile for that network.

The server 721 can provide alternative networks in any reasonable manner, which does not exclude instructing all vehicles 701 to switch to a single new network. The server 721 instructs the transmitter 715 to send the reprogramming instructions at 1107.

Since, in this example, vehicles 701 that have lost communication with the server 721 will now regain communication, the server 721 can actually receive feedback as soon as the vehicles 701 connect to the new network at 1109. This allows the server 721 to at least partially ensure that the reprogramming instructions were successful, as well as determine whether a particular reprogramming instruction is not working or a new proposed network does not appear to be working.

The server 721 may know how many vehicles 701 with which it lost connection when a network went down, which allows the server 721 to determine the success of any reprogramming instruction to some degree. In this example, the server 721 checks for a certain percentage of lost vehicles 701 to come back online via a new network at 1111. That is, for example, using the D, E, F networks example, the server 721 may lose communication with 5000 vehicles 701 when network D goes down. Based on geographic, network capacity, etc, the server 721 may send instructions to 2000 vehicles 701 to switch to network E, and 3000 vehicles 701 to switch to network F. Since the server may not have control over how many vehicles it sends a message to via ATSC, since it is a broadcast, geofencing or randomization can be included in reprogramming instructions as previously discussed. E.g., the server can assign profiles based on geofences that should more or less cover 2000 and 3000 vehicles respectively, and/or could send instructions to each vehicle to randomize between 1 and 5, with 1 and 2 going to network E and 3-5 going to network F.

As they connect to the network, the vehicles 701 re-establish communication with the server, and so the server 721 can determine a percentage of vehicles 701 that have reconnected. In this example, the percentage may be predefined as acceptable at a certain number, which can accommodate the likelihood that certain vehicles 701 were simply powered down or otherwise intentionally disconnected. If the percentage reaches, for example, 90 percent for network E at 1111, the server 721 may cease broadcasting instructions to repurpose to network E.

At the same time, the reconnection percentage for network F may only be at 30 percent presently. In such an instance, the server 721 may wait a timeout delay at 1113, and then either resend a broadcast and/or reallocate some percentage of vehicles 701 instructed to connect to F, over to E. Thus, if E can handle the further increased load, and the server 721 knows that the change to E was largely successful, the server 721 can those vehicles 701 that have not yet successfully connected to F, over to E at 1115. Additionally or alternatively, the server 721 may rebroadcast the initial instruction to connect to F, as a number of vehicles 701 may not have received the instruction for some other reason (e.g. interference cause by urban canyons, being underground, etc). Once a suitable percentage of all vehicles 701 are reconnected, the server 721 can cease broadcast instruction for all new networks or access point names at 1117.

Figure 12:
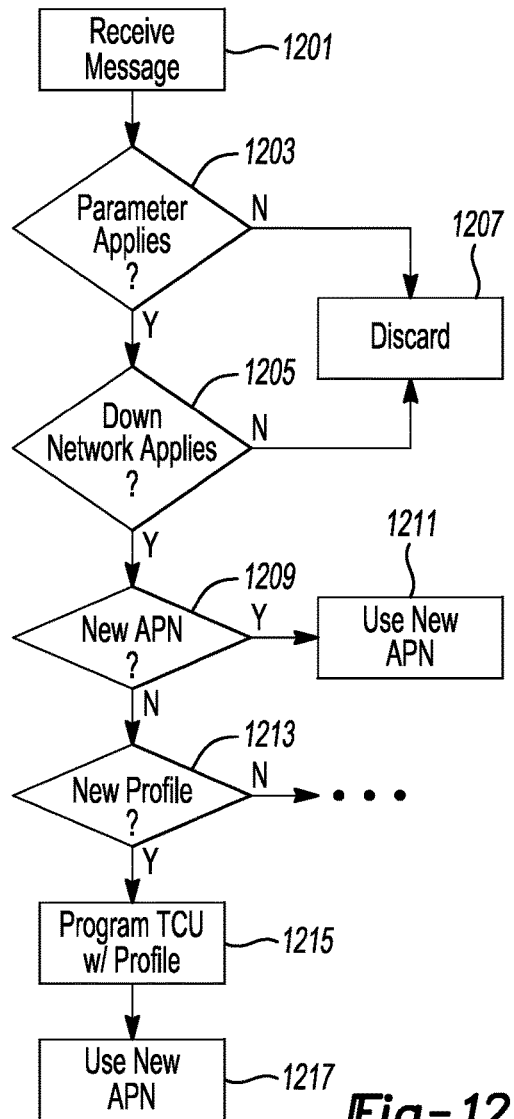
FIG. 12 shows an illustrative process for cellular provider provision handling.

FIG. 12 shows an illustrative process for cellular provider provision handling. This example process is executable by, for example, a vehicle 701 receiving instructions from a remote server 721.

In this illustrative example, the vehicle 701 receives an ATSC message indicating a new cellular network or new access point name that could be used by the vehicle 701. Since the server 721 coordinating the messaging may be sending this information out to all vehicles 701 that could have been, but which may not have been, affected by a disconnection, the message may include one or more parameters (e.g., GPS location, prior, now-lost connection identification, etc) for application of the message, and the vehicle 701 can determine at 1203 if the relevant parameter applies.

Since the parameter may simply be a GPS location set, such as a geofence, because the ATSC transmitter 715 may cover an area larger than an affected area, and thus may designate the message as only applicable to vehicles 701 in the affected area, there may be an additional consideration by the vehicle 701 as to whether the vehicle 701 is currently experiencing a lost connection at 1205. That is, even if the server 721 does not identify the lost connections in the message, the vehicle 701 may be in the affected area (and thus receive and handle the message), but may not be experiencing a lost connection, which would cause the vehicle 701 to discard the message at 1207. In other examples, the server 721 may include identification of the lost connection in the message, so that only vehicles 701 previously connected to the lost connection even handle the message without discard in the first place.

If the message includes a new access point name at 1209, the vehicle 701 receiving and handling the message can switch a communication profile of that vehicle 701 to use the new access point name at 1211. Alternatively, if the message includes a new cellular profile defining a new network carrier to use at 1213, the vehicle 701 can use the information to reprogram the telematics control unit (TCU) to utilize the newly identified network at 1215. This can include use of an identified new access point name (APN) at 1217. There may also be other communication alternatives instructed, and these are simply examples of several alternatives and their utilization.

Figure 13A:
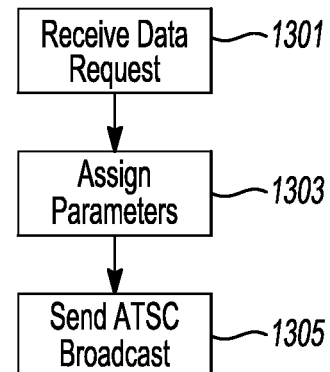
FIGS. 13A and 13B show illustrative processes for data gathering using broadcast and response.
Figure 13B:
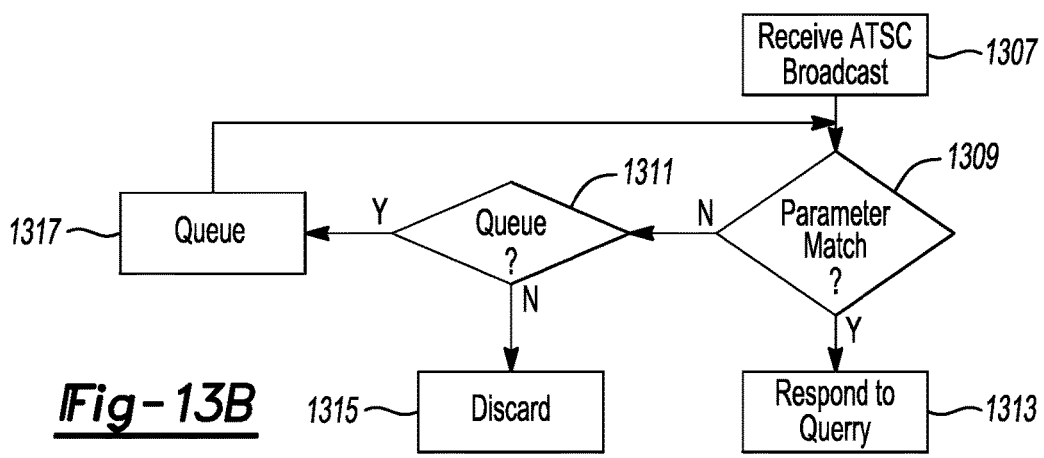

FIGS. 13A and 13B show illustrative processes for data gathering using broadcast and response. This is a general concept that demonstrates how ATSC technology can be used to gather a variety of data from vehicles 701 within a broadcast range of the ATSC transmitter.

For many reasons, an OEM or other authorized party may wish to gather a particular element or elements of data from a multitude of vehicles 701 at once. For example, if it began snowing, the interested party may want to know how many vehicles 701 had reduced speed below 25 miles per hour. To exempt results of vehicles 701 traveling on low-speed roads, those roads could serve as an additional parameter, and by broadcasting the request to all vehicles 701 in a transmission area, and by receiving responses, virtually any subset of vehicle data for a region, or for certain types of vehicles 701 within the broadcast radius, can be quickly obtained.

The preceding request could be formulated in a variety of manners. Several non-limiting examples are presented, along with how a vehicle 701 would discard the message or accept it and respond. Once choice would be to set acceptance parameters of speed <25 mph and location=any road with a speed limit >25 mph. Then, only vehicles 701 with the correct speeds and locations would even accept the message to begin with, and those vehicles 701 could report their speeds, or the simple fact of travel below 25 mph, without further consideration. The report could be done via vehicles 701 telematics control unit back to the OEM or the authorized party.

Another example would be to request vehicle 701 speed in the report, but only on roads having speed limits >25 mph. Then all vehicles 701 traveling on roads with speed limits above 25 mph would report their speed. A third example could be to set acceptance parameters of "traveling more than 10 mph below known speed limit," which would avoid having to determine which particular roads had lower speed limits below 25 mph, and the vehicles 701 could determine (assuming they had nav systems indicating the present speed limit or other access to such data) whether they were both traveling below a posted speed limit by more than 10 mph. This could result in some vehicles 701 that were traveling 15 mph on a 25 mph road reporting, but that may also be useful information. Moreover, the message itself could include reporting constraints that limited those vehicles 701 from reporting.

Vehicles 701 do not necessarily discard messages that do not apply, they may also queue certain messages based on applicable parameters. For example, if the parameter was dynamic and could be met by the vehicle, the message may be queued for a predetermined time period or for a message-defined time period. If the parameter was static (e.g., vehicle_type=SUV) and the vehicle 701 could not possibly ever meet the parameter (e.g., the vehicle 701 was not, nor ever would be, an SUV), then the message may be discarded.

In the example shown, a server 721 receives a data request at 1301. This could come from another remote server (e.g., a city services server requests the preceding data from an OEM server 721 to gauge the traffic response to a blizzard) or from another OEM-internal system. For example, engineers may be working on a project and may need a data point for understanding how a current system is being used. The engineers could devise relevant parameters (e.g., vehicles 701 traveling in temperature conditions above 90 degrees, vehicles 701 equipped with cooled seats, to determine how many of those vehicles 701 were using cooled seats at those temperatures) and request that server 721 send out such reporting requests to vehicles 701 over a wide area (such as nationwide) via a plurality of ATSC transmitters 715.

The server 721 could assign the relevant parameters for accepting the message and/or relevant parameters for queueing and/or relevant parameters for the vehicle 701 to consider when reporting at 1303. The server 721 then instructs the plurality of ATSC transmitters 715 to send out the broadcast and vehicles 701 receiving the broadcast, to which the broadcast applies, can self-report as appropriate and as defined by the broadcast.

When a vehicle 701 receives the broadcast at 1307, the vehicle 701 determines based on the acceptance parameters at 1309 if the message or request applies to that vehicle 701. Again, this can include, for example, environmental parameters, geographic parameters, vehicle 701 characteristics, etc. If the parameters are not met, the vehicle 701 may determine if there are queuing parameters associated with the message at 1311. In some examples, there may not be queuing parameters, but rather, as previously noted, the vehicle 701 may queue or not queue a message based on whether or not the vehicle 701 could meet the acceptance parameters at some point in the future (e.g., weather or speed could be achieved, a change of vehicle 701 body type could not).

If the vehicle 701 determines that no queuing is needed, the vehicle 701 can discard the message at 1315. Otherwise, the vehicle 701 can queue the message at 1317, which can cause the message to be handled at a time when the parameter is met at 1309. Once the message is handled by the vehicle, the vehicle 701 responds to the query in the message at 1313, again in accordance with any instructions and/or constraints specified in the message.

In still another example use case of ATSC technology, dynamic routing of vehicles 701 out of a locality can be achieved in a manner that does not overburden networks that may already be struggling under increased traffic. It is common for cellular networks to become overloaded during certain high-capacity events, such as sporting events. Tens or hundreds of thousands of additional devices may be attempting to use a network, which can put an extreme strain on network responsiveness.

While all these people tend to arrive over a prolonged time period, they all tend to leave at roughly the same time, when the event is over. This means that a network may have to support 100× or a 1000× as many data requests for navigation information as it is used to supporting. One solution is to simply have vehicles 701 rely on their own internal navigation computers, which can provide routing even in the absence of an active cellular network, but certain vehicles 701 lack such computers, and many other users prefer to use routing that is also indicative of present traffic conditions, especially when traffic is going to be very heavy, as in the above scenario. If all these requests are sent to the network in approximately the same timeframe, especially if the requests are ongoing for reasons like traffic updates, the network often is incapable of responding to the bulk of these requests, leading to even further slowdowns in vehicle traffic.

Through the use of ATSC technology, it is possible to strategically route vehicles 701 out of a locality, provide near real-time traffic reports, and adapt to changing traffic conditions, all while placing limited strain on the cellular networks. In some instance, the illustrative embodiments place very limited or possibly no strain on the networks (if vehicles 701 do not report back), in other instance, those with some feedback aspects, limited strain is placed on the networks, but far less strain than if all users were relying on cellularly transmitted data for all traffic-related decisions.

For example, if 50,000 vehicles 701 were leaving a locality in an infrastructure that normally did not carry so much vehicle traffic, the illustrative embodiments allow for selective routing of those vehicles 701 based on present locations, optimal routes relative to present locations, and even accommodation of certain alternative routes suitable for some vehicles 701 and not others (e.g., low bridges).

In these same situations, even if a single entity were unifying traffic control, access to that entity through cellular networks could be extremely constrained. In the illustrative embodiments, however, a unifying system of guidance, such as a city or OEM server 721, can devise exit routes for vehicles 701 based on where those vehicles 701 are presently located. That is, instead of all vehicles 701 being given a general preferred route or primary routes to certain main exit thoroughfares (e.g., highways), the server 721 can compartmentalize instructions and deliver the instructions with geo-fencing, so that a vehicle 701 in a given geofence can receive instructions pertinent for that vehicle 701 based on that vehicle's location, even if the server 721 does not specifically know that vehicle 701 is there.

The instructions can be sent for individual geofences or as a large set of map data, wherein vehicles 701 can selectively receive or utilize data based on their own particular location data. The solution will be described with respect to a formulated coordinated map, with vehicles 701 following instructions from the map that are pertinent to the vehicle's present coordinate set, although it is appreciated that individual blocks of instructions correlated to coordinate sets could also be sent, or smaller blocks of map data correlated to coordinate sets, where a given vehicle 701 would accept, queue or discard a message based on its present coordinates and/or characteristics.

Because transmission of the data does not rely on the cellular networks, but rather on a broadcast medium that can reach any number of vehicles 701 at once, provided they are in communication range of a broadcast, the server 721 can also update and resend map data or instructions as suitable. So, for example, if an accident occurs, the server 721 can quickly reroute vehicles 701 in certain geofences with a limited or full map update, providing reactive, coordinated traffic guidance with reasonable assurances that the guidance will reach, and be usable by, all or most vehicles 701 that include an ATSC receiver.

Map data may further include guidance based on a vehicle 701 type, or even based on a vehicle 701 eventual destination. For example, a main road out of town may lead to two highways N and M. If a vehicle 701 is going to highway N, there may be a better route than if a vehicle 701 is going to highway M. The data for the exit strategy (map subset) would be accepted by all vehicles 701 in geofence X, even though some vehicles 701 were going to M and some vehicles 701 were going to N.

One option is simply to let vehicles 701 derive their own best-route based on the applicable map data (e.g., the server 721 recommends roads, or roads to avoid, for achieving M or N). A potential problem with this solution, however, would be that if every vehicle 701 chose the same sub-route, that sub-route would become suboptimal, as, for example, all M traffic would go to sub-route M_1. One way to address any concern about this would be to use some of the randomization proposals presented earlier herein, whereby, for example, the server 721 calculates 3 reasonable alternatives, and then a given vehicle 701 randomizes onboard in order to select a route. This would have a reasonable expectation of dividing traffic evenly between the alternatives, and, for example, if one road has twice the capacity of two others, ½ the randomization could be assigned to that road, and ¼ to each of the other two roads, to balance the differences in capacity.

It may also be reasonable to delay some vehicles 701 so that all vehicles 701 do not arrive at M or N at the same time, so some of the alternative routes may be designed to delay the arrival of the vehicles 701 thereon, but which may have the net effect of keeping all traffic moving. Because of solutions such as this, drivers may elect not to follow a recommended path (knowing they are on the "slower" path). If vehicles 701 deviate from a planned path, reporting can be done to the server 721 to allow the server 721 to adjust modeling and deliver new solutions to continue to keep traffic flowing as smoothly as possible.

Thus, even though all vehicles 701 in region X are initially on the same road headed to M and N, those vehicles 701 could receive and process directions that resulted in sub routes M_1, M_2, M_3, N_1 and N_2, based on which highway was needed and some reasonable allocation between route alternatives. Road indicators that provide the usefulness (or impossibility in some cases) of a given road could be included as well, which can help avoid drivers heading down roads which will result in significant traffic increase and/or an impassible situation. And, as traffic shift and vehicles 701 back up or clear an area, complete or partial rerouting and new recommendations can be generated by the server 721 and delivered to the vehicles 701 without concern about whether the cellular networks are overloaded as an impediment to delivering the guidance.

Also, in many cities, certain roads are simply temporarily closed and navigation data may not indicate this. To avoid having many vehicles 701 choose a seemingly clever route, only to encounter a closed and impassible road, then having to backtrack and be added to the general traffic flow again, the map can include such closures so that navigation systems can accommodate them.

FIG. 14 shows an illustrative process for selective traffic routing executable by, for example, a server 721. In this example, the server 721 plans exit strategies for a plurality of exit paths leaving a city based on vehicle 701 type, vehicle location, expected traffic, present traffic, eventual destinations, etc. Eventual destinations do not need to be the actual destination of a vehicle, but rather, for example, a major exit artery at which the vehicle 701 would like to preferentially arrive. Provided that an eventual destination is out of town, virtually every path out of town will include such an artery, even if there are a few dozen such arteries overall.

The server 721 can determine preferred outflow volumes, for example, at 1401, based on capacity of roads and an expectation or knowledge of where vehicles 701 are generally presently located. Based on suitable routes for traffic out of town, the server 721 can then divide the routes in a manner that reasonably accommodates expected traffic flows at 1403.

This can include, for example, assigning geographic and/or random parameters to each route at 1405 (e.g., parameters dictating which vehicles 701 should use which route based on where those vehicles 701 are presently located). The server 721 can then send the map data to an ATSC transmitter 715 and instruct broadcast of the map data at 1407.

FIG. 15 shows an illustrative process for selective traffic routing handling, executable by, for example, a given vehicle 701. In this example, the vehicle 701 receives the ATSC broadcast while it is in an ATSC broadcast coverage area. The map data may be received and processed by all vehicles 701 or, for example, processing of the map data may be predicated on the vehicle 701 being within a geographic boundary designated by the broadcast (e.g., a boundary spanning the whole locality for which exit paths are determined). If the processing parameter matches at 1503, the vehicle 701 processes the map data, which can include temporarily incorporating the map data into the vehicle's own navigation set.

If there is no match, the vehicle 701 may discard the data at 1513 or, if the vehicle route, for example, includes coordinates that will carry the vehicle 701 within the parameter coordinates (making the data applicable), the vehicle 701 may store the data for if and when this occurs.

If the data applies to the vehicle 701 (e.g., the vehicle 701 is within the parameter boundaries for processing the data, in this example), the vehicle 701 may access a local dataset within the map data at 1504. That is, if the map data is subdivided into geofenced locations within the locality, the vehicle 701 may be within one of those geofenced locations. If the vehicle 701 is within the locality, but not in any geofenced location, within the locality, for which an exit path is defined (e.g., the vehicle 701 is just a local resident doing local business), the vehicle 701 may elect to use prior onboard navigation data.

Another way to distinguish between local residents and exiting traffic is to associate one or more main exit thoroughfares with exit paths that the server 721 plans from within a given geofenced location inside the locality. These would typically be intermediate destinations for a vehicle 701 exiting town (e.g., a highway on the way to a home), but most traffic that is actually leaving town would likely utilize one of these thoroughfares. Thus, if a given vehicle 701 receiving the data has a set navigation path including one of these thoroughfares, the vehicle 701 is considered exiting town, and can know to use the data based on the association of the intermediate thoroughfare destination with the exit path. If a vehicle 701 lacks such an intermediate destination (or has no set path), the vehicle 701 may be considered to be engaged in local travel, and may rely on informational data such as road closures, included in the map data, but may eschew exit path strategies in order to simply path to wherever it is the local driver is going within the locality.

Other vehicles 701 may have no designated destination, but may have, for example, a "home location" that is outside the locality. In order to determine the applicability of the exit path strategies to these vehicles 701, the vehicles 701 having no exit path but having an out-of-town home location may treat the home location as a present destination for purpose of determining applicability of exit path strategies and for selection of a particular intermediate destination (intended main thoroughfare).

Once a vehicle 701 has determined the applicability of a given exit path or exit path set corresponding to the vehicle's present coordinates within the locality, the vehicle 701 may adjust a present route according to server-recommended exit paths correlated to that locality at 1505. This can include, for example, a single recommended path, several paths to several different intermediate destinations, or even a plurality of paths to a single intermediate destination. In the latter case, the vehicle 701 may randomly or semi-randomly choose (or according to other reasonable strategy) between the plurality of paths all ending at the same intermediate location (main thoroughfare).

The vehicle 701 will also, in some instances, issue a report back to the server 721 at 1507. This may or may not be possible depending on the level of cellular traffic, but the vehicle 701 could also report with a simple text message or other basic data element indicating an intended path, which could keep the server 721 informed without overburdening the network with data. For example, each exit path may simply have a number assigned thereto, and the vehicle 701 could report the selected path's number, so a simple text message of a few characters can serve to report the vehicle's intent and allow the server 721 to adjust exit pathing strategy based on how many vehicle's reported intended use of a given path. Other feedback could come from camera videos from cameras installed at roadway side or helicopter monitoring.

When the server 721 can get feedback, it can quickly determine if a given path is or will be overwhelmed, and can take immediate steps and rebroadcast to mitigate a situation before it even fully develops. For example, if 100 vehicles 701 intended to use a path that the server 721 only intended for 50 vehicles, the server 721 could redraw one or more geofences around subsets of roads leading to this path (and thus presumably encompassing a subset of these vehicles) and recommend different exit paths via ATSC broadcast. Updated and adaptive recommendations can thus be delivered en masse and on demand without reliance on the cellular network for delivery.

While the vehicle 701 is traveling along a path, the driver may, for whatever reason, choose to deviate from the path. If the vehicle 701 remains on the path, there may be nothing to report, in the interest of keeping cellular traffic low and since the server 721 already knows which path was chosen for that vehicle 701. But if the driver deviates from the path at 1509, the vehicle 701 may report the deviance at 1511, so the server 721 can accommodate, especially if there ends up being mass deviance from a path, which may also tend to suggest that the path is a poor one or is overcrowded.

FIG. 16 shows an illustrative process for adjusting an adaptive selective traffic routing model. This is an example of how the server 721 adjusts exit pathing for geofenced locations within a locality responsive to vehicles 701 reporting various changes in position, path usage, deviances, etc.

Since the server 721 may not know exactly how many vehicles 701 are in any given geofenced location when initial data and exit paths are sent, or how many vehicle 701 will elect to use a given path, it may be useful if the server 721 can adapt to reporting and rebalance any expected overflows of traffic. Accordingly, as vehicles 701 report locations or path selection, the server 721 can adjust exit path modeling, which can include providing additional exit paths for a geofenced location or repurposing underused exit paths for one location to another location (e.g. an adjacent location), or simply redrawing geofence boundaries as needed, for reasons such as those noted herein and the like. The model adjustment can include designation of vehicle 701 to chosen exit paths, or predictions if vehicles 701 simply report present locations, and if there is an apparent overflow condition occurring or that will occur at 1605, the server 721 can adjust the overflow at 1607 by dividing the exit paths in some manner that suggests alternative exit pathing for at least a subset of the vehicles 701 projected to result in overflow.

The server could even detect, for example, that a given intersection was projected to have a 30 vehicle backup in a single direction, when the initial strategy was to mitigate this backup to no more than 20 vehicles. The selective repathing can redraw a boundary such that the last 10 vehicles 701 in line (if and when the line forms, based on where those vehicles 701 are projected to be located) are instructed to take a new or different exit path that prevents those vehicles 701 from waiting at the intersection. The first 20 vehicles 701 fit within the original strategy, but the other 10 vehicles 701 (give or take) may immediately choose a new exit path that prevents the 30 vehicle backup from occurring or persisting. While the first 20 vehicles 701 wait, even new vehicles 701 entering the boundary for the last 10 vehicles 701 will be privy to the repathing, so this should effectively help prevent the backup continually, until if and when the alternative paths are also overloaded. The relevant parameters for use of the new paths are then set at 1405 (e.g., if vehicle 701 is in a position wherein there is an expected 20 car backup preceding that vehicle 701 at a light) and the server 721 can instruct delivery of the updated map data via ATSC at 1407.

Figure 17:
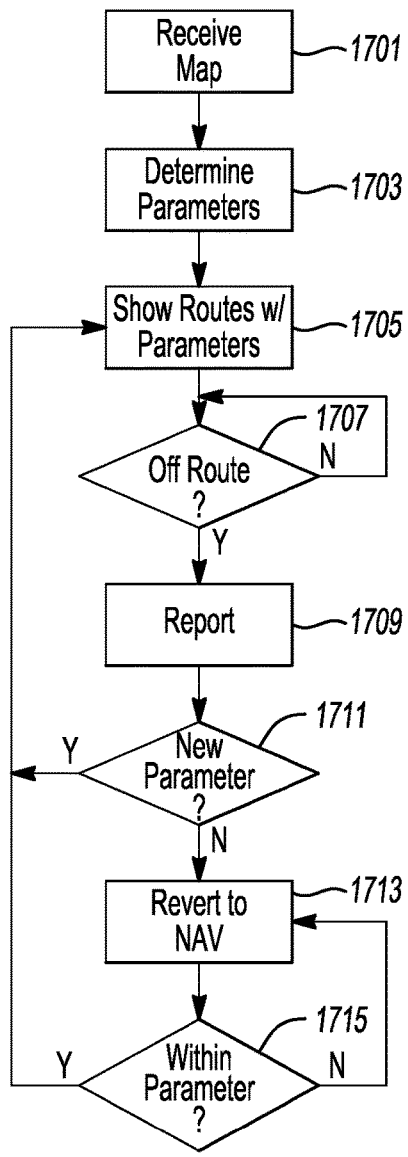
FIG. 17 shows an illustrative process for handling map data from a selective routing broadcast.

FIG. 17 shows an illustrative process for handling map data from a selective routing broadcast. Again, this example uses the concept of a whole map including designated exit paths for given geofenced locations within the locality of the map, or a locality within the map, but a similar concept could extend to a series of instructions each having correlated acceptance parameters corresponding to a given geofenced area within which a receiving vehicle 701 is presently located.

In this example, the vehicle 701 receives the whole map at 1701 and determines a set of vehicle-applicable parameters such as, for example, present location, vehicle 701 characteristics (height, width, etc), intermediary destination (main thoroughfare), etc at 1703. Using the map data and the exit paths assigned to vehicles 701 having the characteristics and location of the object vehicle 701, the vehicle 701 may show one or more recommended exit paths based on the vehicle's present location and intended intermediary destination at 1705.

In this example, as long as the vehicle 701 adheres to one of the recommended paths, no reporting is used, although an initial report of an intended or present exit path may be sent in any event. If the vehicle 701 deviates from a recommended exit path at 1707, the vehicle 701 may report 1709 the present location of the vehicle 701 and/or any intended new exit path being used, if an exit path is being used. Choice of a deviance by the driver may also result in a new parameter being applicable at 1711, which can include, for example, entering a new geofenced boundary with different exit paths. If there is no new parameter applicable, the vehicle 701 may revert to use of standard navigation at 1713, which still may accommodate any road closures or other data indicated by the map data, but which may not rely on any particular server-defined exit path.

In this example, if, at any point, the navigation system brings the vehicle 701 into a situation where a new parameter applies and/or back within an applicable parameter of previous data at 1715, the vehicle 701 may show updated recommended pathing based on the parameter.

For example, a user in geofence X may initially elect to use exit path M_1. This can be reported and the vehicle 701 may begin travel on exit path M_1. Then the user may decide to take a detour to a grocery store, which is not on any exit path but exists within X. The user exits M_1, and the vehicle 701 reports the exit. Since the user is still within X, the pathing for X may still be shown, but the vehicle 701 is using onboard navigation to navigate to the grocery store, which does not correspond to any server-designated strategy.

If the grocery store was within geofence Y, adjacent to X, when the vehicle 701 passed into region Y the exit path recommendations may update (showing recommended routes out of town), but the vehicle 701 would still be pathing to the grocery store using onboard navigation data. When the user completed the trip to the store, the user may then re-enter a recommended exit path R_1, corresponding to region Y where the vehicle 701 is now located, and this data could be reported, and the vehicle 701 could begin to rely on the exit strategies for Y and R_1 based on where the vehicle 701 is now located and the path the vehicle 701 is now traveling. All of this can be accommodated by the illustrative embodiments with little to no communication between the server 721 and the vehicle 701, and so the burden on the cellular network is very low, even though the vehicle 701 (from a driver perspective) is receiving highly relevant and specific information germane to its present location and apparent intentions.

Figure 18B:
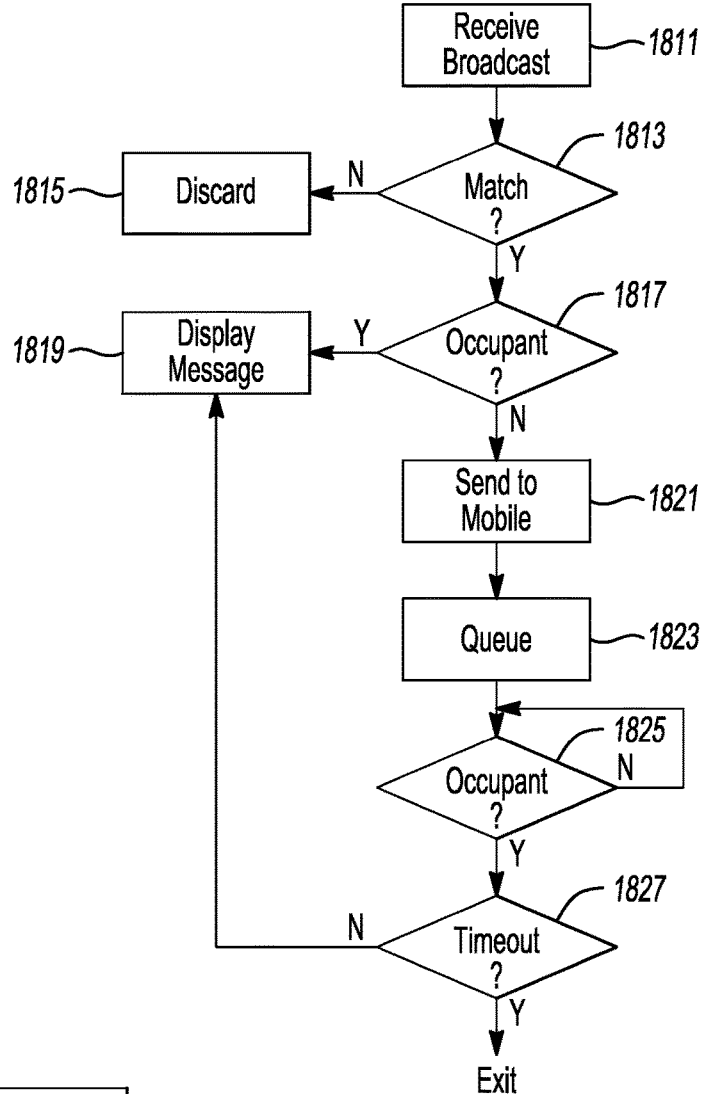
FIGS. 18A and 18B show illustrative processes for selective alert handling.
Figure 18A:
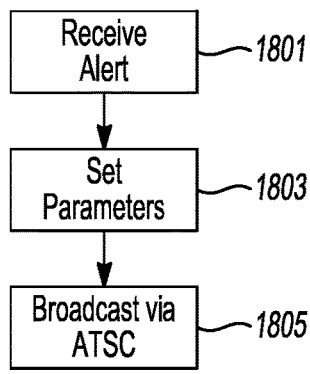

FIGS. 18A and 18B show illustrative processes for selective alert handling. This is a concept that allows vehicle alerts to be broadcast to all vehicles 701 within a broadcast region, but only vehicles 701 to which an alert applies need handle the messages. A basic example of this could include a recall notification, wherein the server 721 would receive the notification at 1801 and determine that vehicles 701 having certain characteristics (make, model) or certain parts (XYZ brake systems) needed to accept the message, and so this parameter (the characteristic) could be set at 1803 as the acceptance and processing parameter for the message. The server 721 could then instruct the ATSC transceiver to broadcast the message.

A vehicle 701 may then receive the broadcast at 1811 and determine if that vehicle 701 included the necessary characteristic (e.g., make, model, XYZ brake system, etc) for handling the message at 1813. If there was not a match, the vehicle 701 may discard the message at 1815. Unless the parameter was a conditional that could eventually be met (e.g., present engine temperature plus a make and model, wherein the vehicle 701 met the make and model but not the present engine temperature), there may be little reason to queue the message.

Also, in this example, it is contemplated that a given occupant (e.g., an owner) may be a condition for delivery of the message, so, for example, all vehicles 701 with the characteristic may handle the message, but then those vehicles 701 may further determine at 1817 if an owner or other designated recipient (typically designated by a characteristic that the vehicle 701 can determine, e.g., not "Bob Smith," but rather "predefined primary user") is present in the vehicle 701 when the message is received. User presence can be determined based on a presently paired or present device that corresponds to an owner or primary user, through use of a camera or other biometric, or another number of similar methods.

If the user is present, the vehicle 701 may display the message on an in-vehicle display at 1819. If the user is not present, the vehicle 701 may try to relay the message to a known user device (e.g., phone) at 1821. This may also result in queuing of the message in the vehicle 701 at 1823. If a message is queued, then if and when a user is later present at 1825, and assuming the message has not timed out at 1827, the message can be delivered in-vehicle. Some messages may be only temporally relevant, and thus may have a timeout associated therewith, so later delivery of a now-irrelevant message does not confuse a user.

Figure 19:
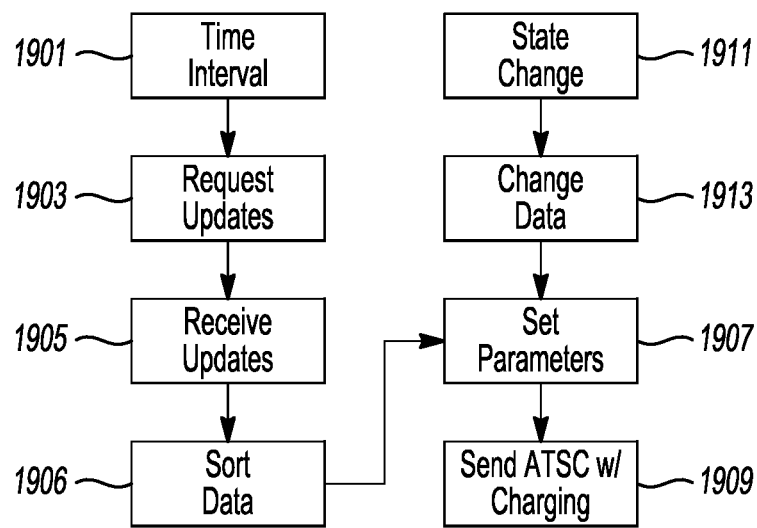
FIG. 19 shows an illustrative process for periodic charging data updating.

FIG. 19 shows an illustrative process for periodic charging data updating. This is another example of use of ATSC technology to provide real-time updates on electric vehicle (EV) charging availability. There are limited places in the world where EVs can be charged, relative to the number of places that gasoline powered vehicles 701 can be fueled. Also, unlike gasoline vehicles, EVs take significantly longer to refuel. The combination of these factors can make it desirable to know the availability of EV charging, which may be limited at any time, as well as any wait times associated with charging, which may be significant relative to other refueling times.

One possibility is for vehicles 701 to request, via direct connection, updates on EV charging. This is a periodic solution for real-time updates, and it further requires a lot of bandwidth in the aggregate. Even if this information were individually pushed to vehicles, the amount of bandwidth consumed by such information, worldwide, would be ongoing and massive. Moreover, vehicles 701 would either need too much information, or would need to report their locations, in order for useful information to be received, and either solution consumes additional bandwidth and incurs additional cost.

Using ATSC, local EV charging availability can be broadcast to all vehicles 701 in real-time at limited cost using no cellular bandwidth. Since only vehicles 701 within the broadcast range receive the information, there is no need to have the vehicles 701 report coordinates. Also, since all availability can be associated with relevant geographic parameters, a given vehicle 701 can ignore most information that is not geographically pertinent. Thus, a single broadcast of all available EV stations can be presented for a given broadcast area, representing present availability, and vehicles 701 can decide which information is pertinent and which information should be ignored.

Further, this information can be updated as spaces free up and/or are reserved, and so a reasonable near-continual inventory of locally available charging can be delivered with low financial and bandwidth overhead, if desired. This can additionally reduce strain on cellular networks, and vehicles 701 need not continually search and request for station information as they travel, unless they are outside the range of any ATSC transmissions and need recharging information.

On the broadcast side of things, FIG. 19 shows several illustrative processes that can be used to provide EV availability updates. A server 721 can execute both processes, one path being a request path, and one path being a push path. In this example, every certain time interval at 1901, the server 721 can request updated charging use/reservation information at 1903. Reservation information may be counted as use information, as the reservation may represent both a hold period and a use period. Reservations which end up unfulfilled are addressed in the other path, but when requesting information, in this example, the server 721 treats reserved bays as used bays.

Once the server 721 receives updates from the various EV stations within a broadcast region of a given ATSC transmitter 715 at 1905, the server 721 can set parameters at 1907 as discussed below. A single server 721 can handle receipt of data from a variety of ATSC broadcast regions, so the server 721 could, for example, receive state or even nationwide data, and sort the data at 1906 based on which reporting locations correspond to which ATSC broadcast regions. Since the server 721 can obtain this information, in most if not all cases, over wired network connections, there are fewer cost and bandwidth constraints than when vehicles 701 request this information. And since the server 721 can deliver this information via ATSC, the cellular network can remain largely unburdened.

In the push model, the server 721 can receive information about a state change at a given station at 1911. This can correspond to a completed charging, a near-completed charging, a reservation completion, a reservation near-completion or a reservation cancellation. What data is received by the server 721 may depend on how granularly the server 721 tracks the availability information.

Responsive to receiving notification from a station at 1911, the server 721 can adjust its own internal data at 1913, which can cause a new ATSC notification to be sent, or which can modify an upcoming ATSC notification. For example, the server 721 may send out updates every 5 minutes, 10 minutes, etc. If the server 721 is not constantly gathering live data up until the notification, then certain state changes could occur from when data was gathered relative to when notice was sent. By having stations report state changes as above, while not necessary, the accuracy of reported information can be improved in some instances, depending on data gathering and reporting strategies.

Once suitable data has been gathered, and when the server 721 is going to send out a report, the server 721 can set acceptance or applicability parameters for the report and/or subsets of data in the report. For example, acceptance parameters can define relative geofences within the data around the various charging stations, and a vehicle 701 may only accept the data if it is within a range of one of these stations.

In other instances, vehicles 701 may have owner-defined acceptance parameters, knowing the data is simply charging data, and vehicles 701 may only accept and handle the data when, for example, the vehicle 701 is within X distance of a station or is at Y charge %. In other cases, all EVs may be notified whenever a charging station within a certain range is available, in case an owner wants to top off a charge, even if charging is not immediately necessary, since the owner will at least know that a bay is likely available for use at that immediate time, and proximate to a vehicle 701.

Once any relevant parameters have been set, the server 721 can instruct a given ATSC transmitter 715 or station controlling the transmitter 715 to send out the update at 1909.

Figure 20:
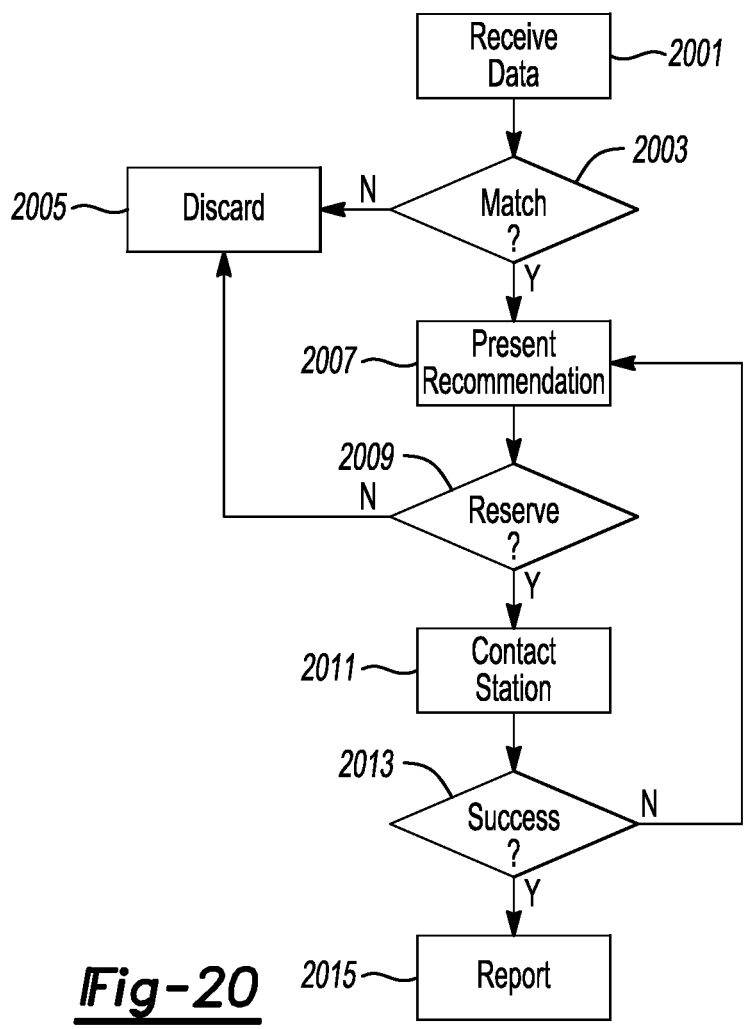
FIG. 20 shows an illustrative process for handling charging alerts.

FIG. 20 shows an illustrative process for handling charging alerts. A vehicle 701 can receive the ATSC broadcast at 2001 and then can elect whether or not the data is relevant. Vehicles 701 that lack EV capability may still receive the message, and discard the message because those vehicles 701 do not need the information. Other vehicles 701 in the broadcast range may be too far from a station, or may not need charging, and so may also discard the message at 2005. The message can be queued, but since this information represents real-time data and is constantly changing, queueing for any significant period of time may not be too useful. Nonetheless, queueing is possible under certain circumstances or when appropriate (e.g., when a vehicle 701 is about to pass over a charge threshold or when a vehicle 701 is approaching an applicable range, but not yet in the range).

When there is a match of parameters at 2003, indicating that the vehicle 701 should take an action, the vehicle 701 may present a recommendation or information about local, available charging stations at 2007. Which data is contemplated and presented by the vehicle 701 can also be a function of charge state—e.g. vehicles 701 that are merely top-off candidates, for example, above 50 percent charge, may only see very proximate stations, but vehicles 701 that are below 10 percent, for example, may see data for a wider region, since those vehicles 701 may more critically need charging.

Also, in this example, a vehicle 701 can reserve a charging station at 2009. This can include sending a message to the charging station requesting reservation. If the vehicle 701 does not want to reserve a station bay at 2009, the vehicle 701 may discard the current data set and wait for an update from the next report. Otherwise, the vehicle 701 may contact the station at 2011 and attempt to reserve a bay. If the request is unsuccessful, the vehicle 701 may remove that data from the display (since the bay has been reserved or used) and re-present the information with the modification.

If the vehicle 701 successfully reserves the charging station at 2013, the vehicle 701 may also report this information to the server 721 directly, so the server 721 can treat this as a state change for that station and can update the next data to be sent accordingly. Similar updates can be sent when a vehicle 701 uses a bay, arrives at a station, ends charging, etc., so that the server 721 does not necessarily have to rely on the stations themselves to update charging states for various stations.

Yet a further possible use for ATSC transmission is to broadcast software updates to reach a plurality of vehicles 701 at once while mitigating transmission costs. Vehicles 701 that are powered when an update is broadcast may receive the update, but this could only be a subset of vehicles 701 in a given area. The challenge for an update broadcast planning is to determine when a suitable number of vehicles 701 have received the update via broadcast, and then possibly use direct transmission to get the update to vehicles 701 which do not have the update. Further, while the cost of using ATSC may be much lower than directly communicating with the same number of vehicles 701 as a single broadcast would reach, the cost is likely non-zero, and so there is a desire to not over broadcast data that may only be needed by a minuscule percentage of vehicles 701 within a transmission range, especially when whether or not those vehicles 701 are online is not even known.

To balance the sending of updates, as well as to gauge the success of a transmission, this illustrative example includes a feedback component wherein vehicles 701 can report success, partial success, failure, installation completion, etc. The system may not error-correct on the fly, but knowledge that a large subset of vehicles 701 in a transmission region failed to receive an update could be a good reason to immediately resend the update, or to consider what the problem may have been, fix the perceived problem, and then resend the update.

Further, there may be a number of channels associated with ATSC, and only a subset of those channels may be used for an update. Broadcasts can use increased channels and increased frequency, or decreased amounts of either, in order to adapt to reported uptake and issues. Criticality of an update may also dictate usage levels as well.

For example, without limitation, if the percentage of incomplete downloads of a broadcast file image is higher than a first threshold, the server 721 may request increased channel usage for broadcast and/or increased frequency. Percentages above a lower threshold (indicating more success) may result in simply increasing frequency. Percentages below a certain threshold (indicating widespread success) may result in the server 721 electing to use direct communication to complete transmission of a file image with vehicles 701 still lacking the complete file image.

Figure 21:
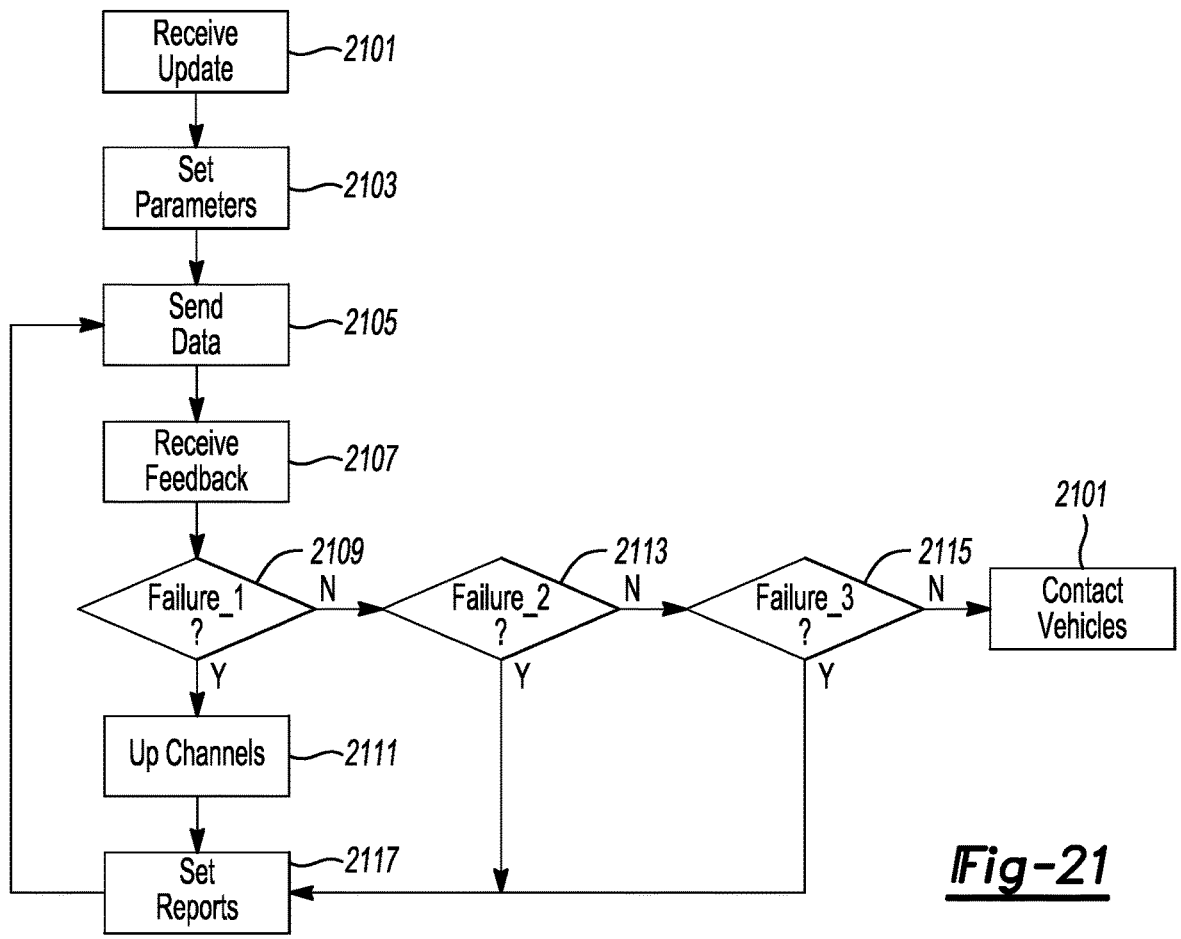
FIG. 21 shows an illustrative process for software update broadcasting.

FIG. 21 shows an illustrative process for software update broadcasting executable by, for example, a server 721. In this example, the server 721 receives an update at 2102 that is to go to one or more vehicles 701 within an ATSC broadcast region. If the total number of vehicles 701 known or projected to be within the broadcast region is below a predefined threshold, which can be a function of the projected cost of broadcast and likelihood of receipt vs. the cost of simply directly contacting those vehicles 701, the server 721 can set acceptance and/or execution parameters at 2103. As before, these parameters can include vehicle 701 characteristics (e.g., make, model, software version, software package, applicable component, etc) or any other suitable parameter.

The server 721 can then instruct transmission of a file image of the update, along with the parameters, from an ATSC transmitter. As vehicles 701 receive and process the update, those vehicles 701 can report back to the server at 2107, allowing the server 721 to determine how many vehicles 701 received some of the update, how many received all of the update, how many were able to process the update, etc. Since many updates cannot be processed until a vehicle 701 is stopped and/or powered down, the information about successful installation may be delayed. Accordingly, in some instances, the feedback may not be instantaneous, although the server 721 may be able to fairly quickly gauge how many vehicles 701 successfully received an entire file image, at least.

As the server 721 receives feedback at 2107, the server 721 can determine reported apparent failures and/or predict failure causes based on reported levels of full or partial receipt of the file image. For example, a first failure threshold (e.g., 30%+ failure to receive full file image) at 2109 can cause the server 721 to increase channel usage requests at 2111 and increase frequency of broadcast to a first level at 2117. A second failure threshold (e.g., 20%-30% failure to receive full file image) at 2113 can cause the server 721 to increase a response frequency at 2117, but may not require use of an additional channel or more. A third threshold (e.g., 10%-20% failure to receive full file image) at 2115, can result in an even fewer number of repeated requests being set at 2117. If the failure rate is below the last threshold, meaning that a predefined acceptable percentage or number of vehicles 701 have reported fully receiving the update, the server 721 may elect to simply contact the remaining vehicles 721 directly instead at 2119.

While a server 721 may not know exactly what vehicles 701 are in an ATSC broadcast region at a given time, or which vehicles 701 are active, it may have a list of all vehicles 701 intended for an update (e.g., a VIN list). As vehicles 701 report back, the server 721 can strike those vehicles 701 from the list, and when a sufficiently low percentage or number of vehicles 701 remain, the server 721 can begin selectively contacting those vehicles 701.

Figure 22:
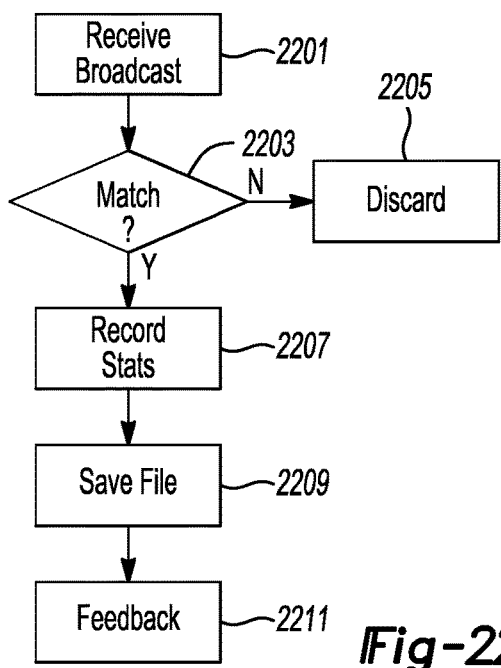
FIG. 22 shows an illustrative process for update broadcast handling.

FIG. 22 shows an illustrative process for update broadcast handling. In this example, the vehicle 701 receives an update or patch notification from the server 721 at 2201. Based on parameters associated with the broadcast (e.g., vehicle make, model, software version, component, etc.), the vehicle 701 determines if any required vehicle 701 characteristics match the parameters for acceptance and processing at 2203. If not, the vehicle 701 may discard the message at 2205. Otherwise, the vehicle 701 may record statistics about the download at 2207, for example, which channel was used, how long the download took, completeness, etc.

After the vehicle 701 saves the file at 2209, the vehicle 701 may also report the recorded statistics at 2211 to the server 721. This can allow the server 721 to make the noted adjustments, as well as determine whether certain channels are providing adequate coverage and whether any channels have issues as determinable by the feedback for vehicles 701 using a given channel reflect poorer performance than other channels. This also can result in changing a broadcast channel. This can also reveal performance issues for a vehicle 701, such as a vehicle 701 receiving poor performance from a channel that is working fine for other vehicles 701, which may reveal issues with a vehicle 701 receiver and provide an opportunity to correct those issues.

Figure 23:
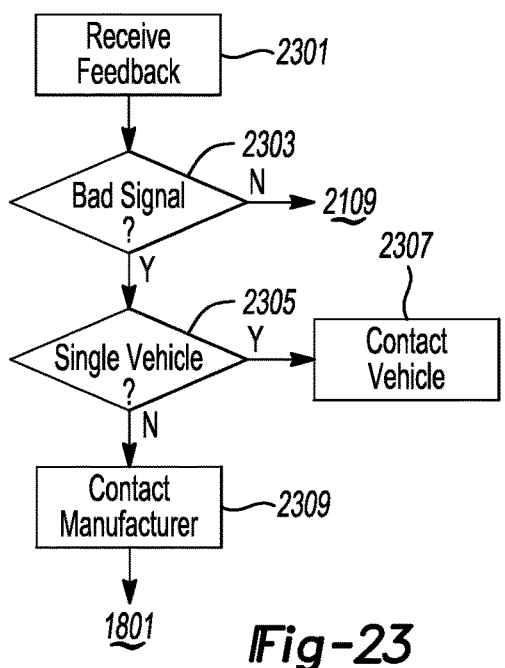
FIG. 23 shows an illustrative process for adapting software update broadcasting.

FIG. 23 shows an illustrative process for adapting software update broadcasting and addressing noted issues, executable by, for example, server 721. In this example, the server 721 receives vehicle 701 feedback at 2301. This can include, for example, the channel used by the vehicle 701, the completeness of download, download time, download speed, etc.

If one or more vehicles 701 using a particular channel all report poor performance statistics for that channel (e.g., below threshold expectations or relative to other channels), the server 721 may attempt to determine if there is an issue with the given channel at 2303. If the channel appears to have an issue, the server 721 can branch to a failure evaluation process at 2109.

In other instances, the failure may appear to be vehicle-side. If a single vehicle, or vehicles 701 sharing no particular unifying characteristic (e.g., same geographic area or close location with other vehicles, certain hardware, common software versions or firmware versions, etc) report the issue, then the server 721 may determine at 2305 that the issue lies with the vehicles 701 themselves (e.g., part or software failure) and the server 721 may contact the individual vehicles 701 at 2307 to try to diagnose and resolve the issue.

If the server 721 observes that there is a unified trait among vehicles 701 experiencing the failure, but that other vehicles 701 on the same channel do not experience failure (confirming that the failure is not with the channel itself), then the server 721 may determine that the issue lies with, for example, a software version. In such instances, the ATSC transmitter 715 can be used to notify the vehicle 701 owners that the vehicles 701 need repair. The server 721 can contact the manufacturer of the vehicle 701 or part and determine if there is an alert that should be issued at 2309, and then can branch to alerting vehicle 701 owners at 1801. If possible, the server 721 can also arrange to have the patch for the issue (and/or the current update the vehicles 701 cannot receive) sent directly to those vehicles 701. If the communication issue can be cured in a timely manner, those vehicles 701 can benefit from further ATSC transmission of the patch that they could not previously receive.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
   one or more processors configured to:
   determine evacuation needs for a plurality of evacuation points;
   determine a geographic perimeter, for each evacuation point, encompassing a number of autonomous vehicles projected to be suitable for servicing evacuation of a given evacuation point;
   formulate an evacuation instruction for each evacuation point, including the geographic perimeter determined for each evacuation point as a parameter for a receiving vehicle to accept a given instruction based on being within the geographic perimeter;
   instruct broadcast of the evacuation instructions from an ATSC transmitter;
   determine that two-way communication has been lost with a plurality of disconnected autonomous vehicles,
   responsive to determining that two-way communication has been lost, determine a first network over which communication has been lost;
   determine a communication alternative, to the first network, for disconnected vehicles to use to re-establish connection; and
   instruct broadcast of the communication alternative as part of a reprogramming instruction from the ATSC transceiver.

2. The system of claim 1, wherein the evacuation instruction instructs an autonomous vehicle receiving the broadcast to travel to the evacuation point.

3. The system of claim 1, wherein the geographic perimeter is determined based on last-reported coordinates associated with a plurality of autonomous vehicles to achieve the number of autonomous vehicles within the geographic perimeter.

4. The system of claim 1, wherein the geographic perimeter is determined based on a projected density of vehicles surrounding each evacuation point, the density for a given evacuation point used to define the geographic perimeter for the given evacuation point.

5. The system of claim 1, wherein the one or more processors are further configured to:
   receive a message from a first evacuation point that the evacuation point has been fully serviced; and
   responsive to receipt of the message, formulate a new evacuation instruction for any vehicles previously instructed to service the first evacuation point, the new evacuation instruction designating at least one alternative evacuation point to be serviced by a receiving vehicle; and
   instruct broadcast of the new evacuation instruction from the ATSC transmitter.

6. The system of claim 1, wherein the instruction further includes a randomizer value, usable by a receiving vehicle in a given geographic perimeter to select one of a plurality of destinations included in the instruction, each of the plurality of destinations correlated to a percentage of results achievable when using the randomizer value and correlated based on projected needs of vehicles at each of the plurality of destinations relative to a total projected number of receiving vehicles.

7. A method comprising:
   determining evacuation needs for a plurality of evacuation points;
   determining a geographic perimeter, for each evacuation point, encompassing a number of autonomous vehicles projected to be suitable for servicing evacuation of a given evacuation point;
   formulating an evacuation instruction for each evacuation point, including the geographic perimeter determined for each evacuation point as a parameter for a receiving vehicle to accept a given instruction based on being within the geographic perimeter;
   instructing broadcast of the evacuation instructions from an ATSC transmitter;
   determining that two-way communication has been lost with a plurality of disconnected autonomous vehicles,
   responsive to determining that two-way communication has been lost, determining a first network over which communication has been lost;
   determining a communication alternative, to the first network, for disconnected vehicles to use to re-establish connection; and
   instructing broadcast of the communication alternative as part of a reprogramming instruction from the ATSC transceiver.

8. The method of claim 7, wherein the evacuation instruction instructs an autonomous vehicle receiving the broadcast to travel to the evacuation point.

9. The method of claim 7, wherein the geographic perimeter is determined based on last-reported coordinates associated with a plurality of autonomous vehicles to achieve the number of autonomous vehicles within the geographic perimeter.

10. The method of claim 7, wherein the geographic perimeter is determined based on a projected density of vehicles surrounding each evacuation point, the density for a given evacuation point used to define the geographic perimeter for the given evacuation point.

11. The method of claim 7, further comprising:
receiving a message from a first evacuation point that the evacuation point has been fully serviced; and
responsive to receipt of the message, formulating a new evacuation instruction for any vehicles previously instructed to service the first evacuation point, the new evacuation instruction designating at least one alternative evacuation point to be serviced by a receiving vehicle; and
instructing broadcast of the new evacuation instruction from the ATSC transmitter.

12. The method of claim 7, wherein the instruction further includes a randomizer value, usable by a receiving vehicle in a given geographic perimeter to select one of a plurality of destinations included in the instruction, each of the plurality of destinations correlated to a percentage of results achievable when using the randomizer value and correlated based on projected needs of vehicles at each of the plurality of destinations relative to a total projected number of receiving vehicles.

* * * * *